(12) United States Patent
Sasaki et al.

(10) Patent No.: US 11,338,678 B2
(45) Date of Patent: May 24, 2022

(54) VEHICLE DISPLAY DEVICE

(71) Applicant: Toyota Jidosha Kabushiki Kaisha, Toyota (JP)

(72) Inventors: Akira Sasaki, Miyoshi (JP); Eisuke Ando, Nagoya (JP); Misako Hayashima, Okazaki (JP); Saki Kitoh, Okazaki (JP); Masahiro Yamashita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 813 days.

(21) Appl. No.: 16/221,810

(22) Filed: Dec. 17, 2018

(65) Prior Publication Data

US 2019/0232786 A1 Aug. 1, 2019

(30) Foreign Application Priority Data

Jan. 30, 2018 (JP) .............................. JP2018-013339

(51) Int. Cl.
  *B60K 35/00* (2006.01)
  *G06F 3/01* (2006.01)
  *B60K 37/06* (2006.01)

(52) U.S. Cl.
  CPC ............. *B60K 35/00* (2013.01); *B60K 37/06* (2013.01); *G06F 3/013* (2013.01); *B60K 2370/11* (2019.05); *B60K 2370/149* (2019.05); *B60K 2370/155* (2019.05); *B60K 2370/1523* (2019.05); *B60K 2370/1529* (2019.05); *B60K 2370/182* (2019.05); *B60K 2370/334* (2019.05); *B60K 2370/52* (2019.05)

(58) Field of Classification Search
  CPC ...................................................... B60K 35/00
  See application file for complete search history.

(56) References Cited

U.S. PATENT DOCUMENTS

| | | | | |
|---|---|---|---|---|
| 10,332,292 | B1* | 6/2019 | Arnicar ................. | G01C 21/00 |
| 10,372,130 | B1* | 8/2019 | Kaushansky ....... | B60W 60/001 |
| 10,589,625 | B1* | 3/2020 | Goslin ................. | B60K 35/00 |
| 10,665,140 | B1* | 5/2020 | Ahn ...................... | G09F 21/04 |
| 10,730,389 | B2* | 8/2020 | Braun .................. | B60K 37/02 |
| 10,860,100 | B2* | 12/2020 | Osterhout ............ | G06F 3/0346 |
| 11,175,501 | B2* | 11/2021 | Ogata ................. | G02B 27/0101 |
| 11,175,526 | B2* | 11/2021 | Pierre ................. | G02B 27/0149 |
| 2004/0036769 | A1 | 2/2004 | Sadahiro | |
| 2017/0124987 | A1* | 5/2017 | Kim ...................... | B60R 11/04 |

(Continued)

FOREIGN PATENT DOCUMENTS

| | | |
|---|---|---|
| JP | H07-154723 A | 6/1995 |
| JP | 2004-082835 A | 3/2004 |

(Continued)

*Primary Examiner* — Vivek D Koppikar
(74) *Attorney, Agent, or Firm* — Dinsmore & Shohl LLP

(57) ABSTRACT

A vehicle display device that includes: a display part having a plurality of display faces that display information and that are provided at at least one location among a front face, a rear face, an upper face or a side face inside a vehicle cabin; a detection part that detects an orientation and a posture of an occupant; and a control part that selects a display face in accordance with the orientation and the posture of the occupant detected by the detection part, and controls display by the display part such that information is displayed at the selected display face.

7 Claims, 16 Drawing Sheets

(56) References Cited

U.S. PATENT DOCUMENTS

| | | | |
|---|---|---|---|
| 2017/0313248 A1* | 11/2017 | Kothari | H04N 5/247 |
| 2017/0334269 A1 | 11/2017 | Akaike et al. | |
| 2017/0343799 A1 | 11/2017 | Ito et al. | |
| 2018/0181359 A1* | 6/2018 | Monroe | G06F 3/0488 |
| 2018/0194227 A1* | 7/2018 | Gussen | B60N 2/002 |
| 2019/0161012 A1* | 5/2019 | Kim | H04N 7/181 |
| 2019/0163288 A1* | 5/2019 | You | G06F 3/0362 |
| 2019/0164463 A1* | 5/2019 | Shim | G09G 5/38 |
| 2019/0176660 A1* | 6/2019 | Xiao | B60R 11/0235 |
| 2019/0180485 A1* | 6/2019 | Kim | G06K 9/00812 |
| 2019/0184825 A1* | 6/2019 | Kim | B60K 35/00 |
| 2019/0184981 A1* | 6/2019 | Jung | B60W 30/095 |
| 2019/0187470 A1* | 6/2019 | Boettcher | B60H 1/242 |
| 2019/0187869 A1* | 6/2019 | Spitz | G06F 3/0484 |
| 2019/0195651 A1* | 6/2019 | Amano | G01C 21/3682 |
| 2019/0196184 A1* | 6/2019 | Takizawa | G01C 21/365 |
| 2019/0204951 A1* | 7/2019 | Joo | G06F 3/044 |
| 2019/0213976 A1* | 7/2019 | Rakshit | B60K 37/02 |
| 2019/0225156 A1* | 7/2019 | Sasaki | B60R 1/12 |
| 2019/0228243 A1* | 7/2019 | Yamaoka | G06F 3/0418 |
| 2019/0295790 A1* | 9/2019 | Noh | H01H 25/06 |
| 2021/0341736 A1* | 11/2021 | Watanabe | G02B 27/01 |

FOREIGN PATENT DOCUMENTS

| | | |
|---|---|---|
| JP | 2005-028982 A | 2/2005 |
| JP | 2005349977 A | 12/2005 |
| JP | 2006-130957 A | 5/2006 |
| JP | 2007-145310 A | 6/2007 |
| JP | 2008-174034 A | 7/2008 |
| JP | 2015102807 A | 6/2015 |
| JP | 2017-109577 A | 6/2017 |
| JP | 2017-210021 A | 11/2017 |
| JP | 2017-213933 A | 12/2017 |

* cited by examiner

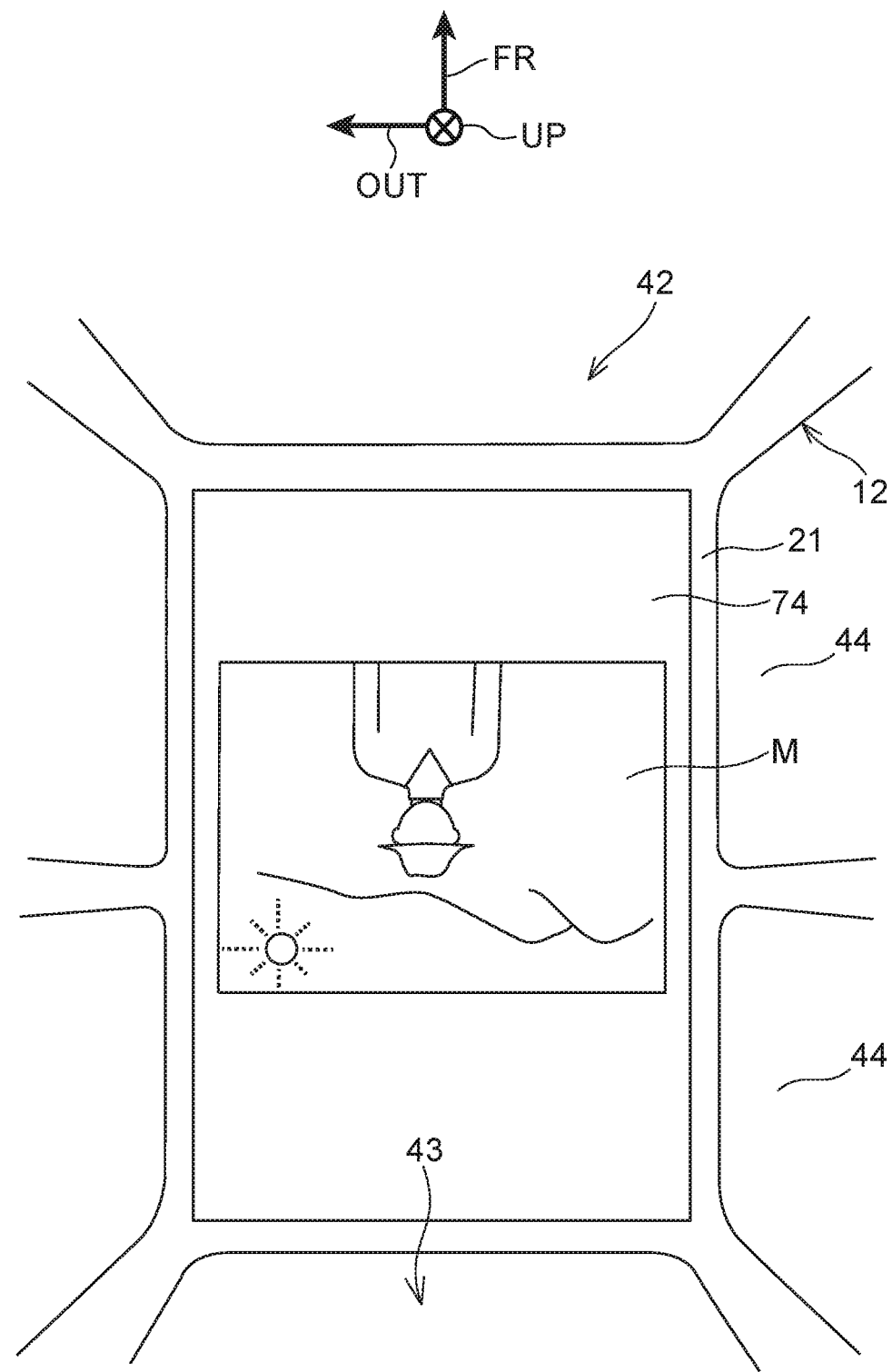

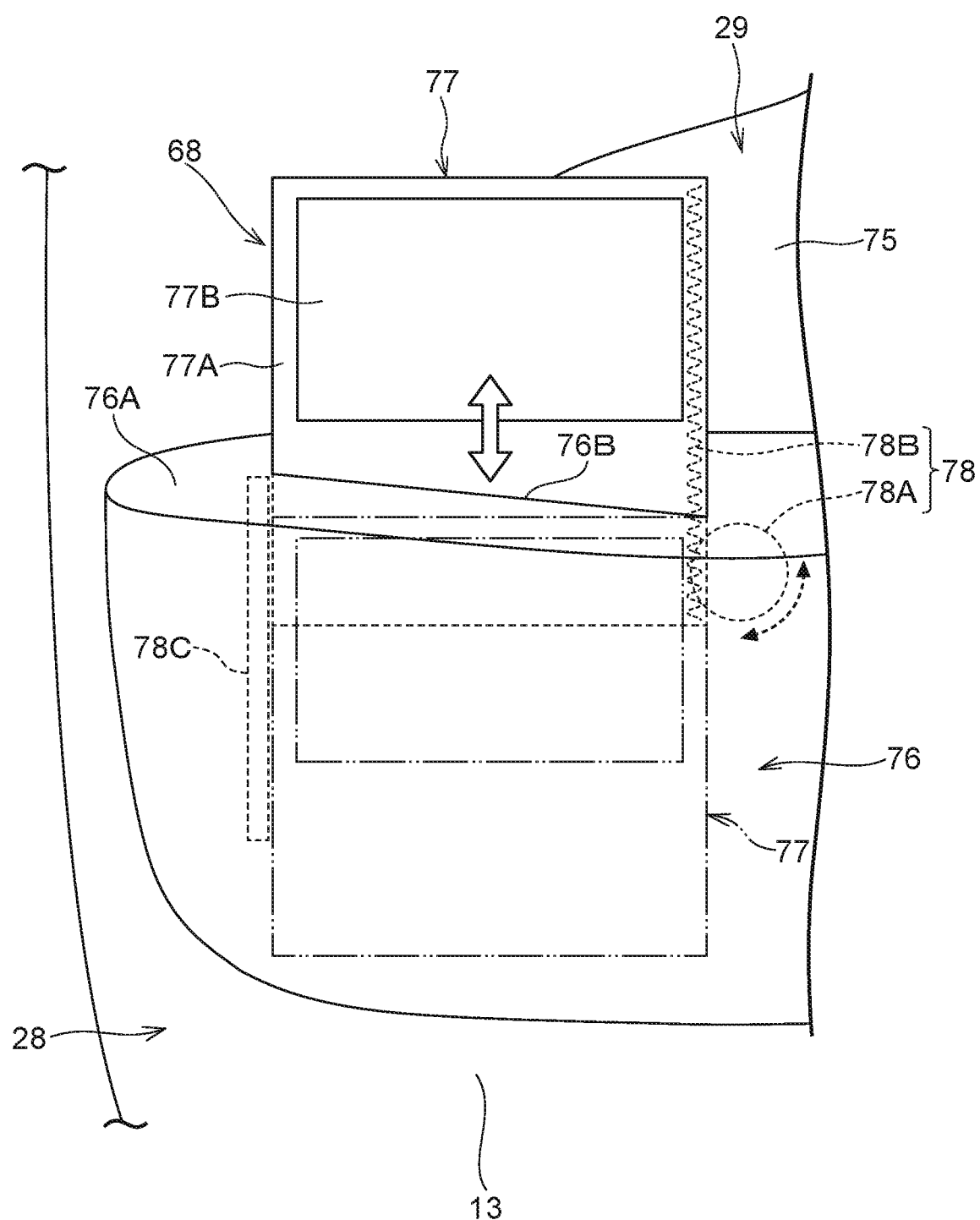

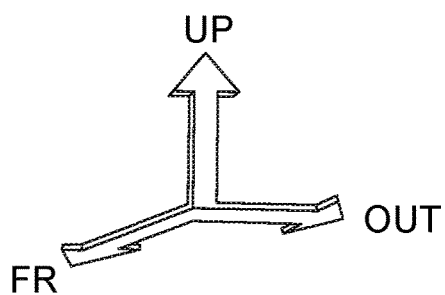
FIG.13
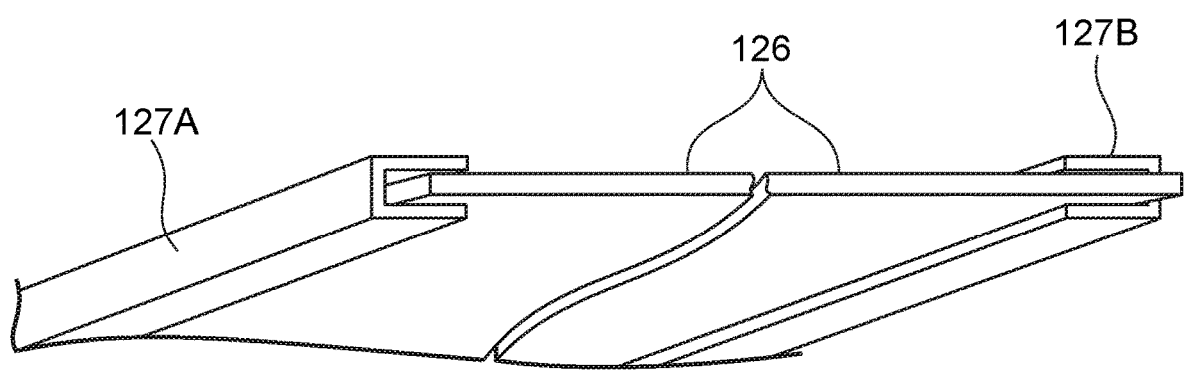

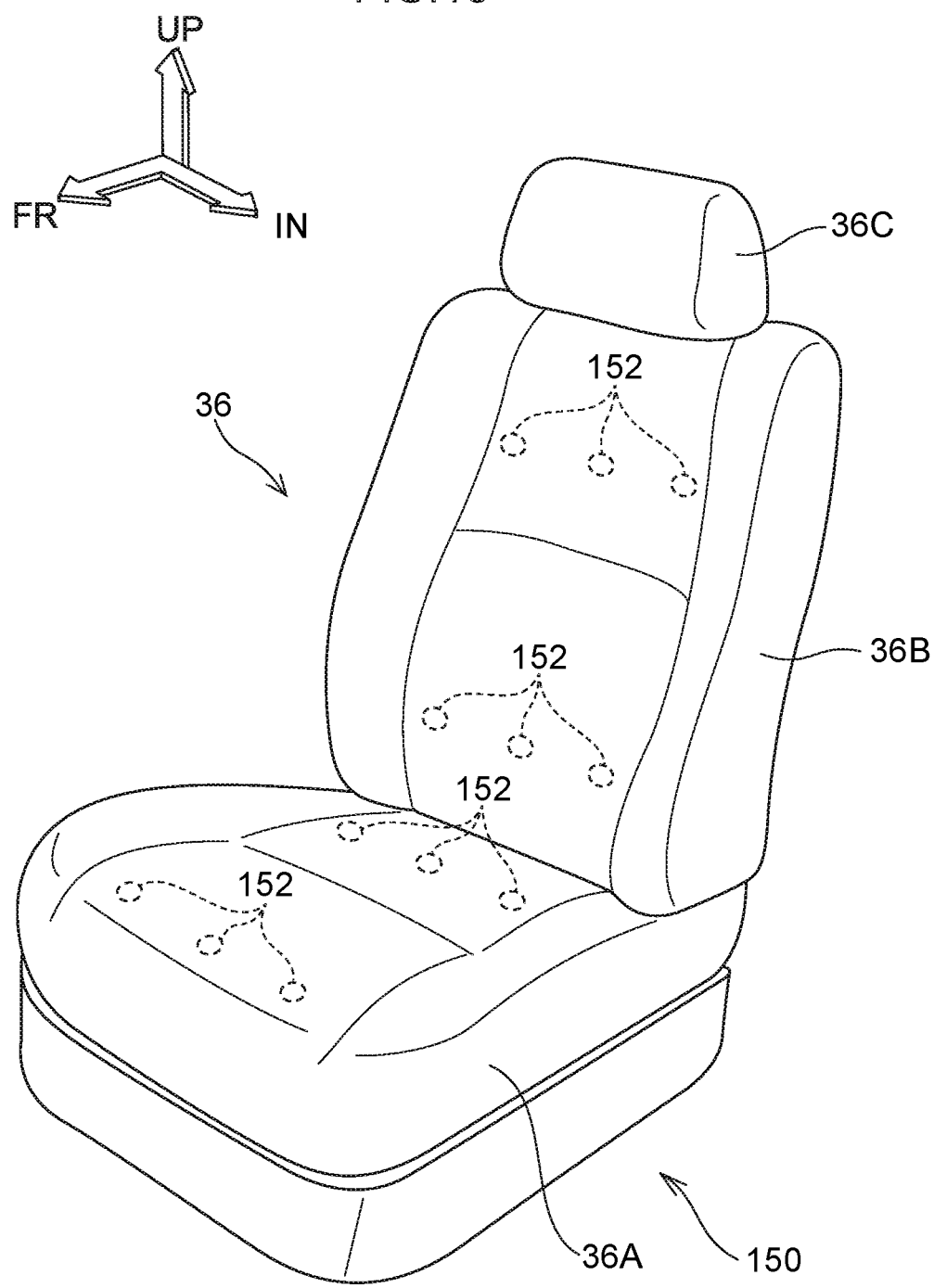

VEHICLE DISPLAY DEVICE

CROSS-REFERENCE TO RELATED APPLICATION

This application is based on and claims priority under 35 USC 119 from Japanese Patent Application No. 2018-013339 filed on Jan. 30, 2018, which is incorporated by reference herein.

BACKGROUND

Technical Field

The present disclosure relates to a vehicle display device.

Related Art

The vehicle of Japanese Patent Application Laid-open No. 2005-349977 is provided with a flexible flat display device, and a ceiling housing part that slidably supports one end edge of the flat display along the ceiling and that can draw out another end edge of the flat display device in front of a rear seat.

In a vehicle that is capable of autonomous driving and that has a display part that displays information, the posture of an occupant, including the driver, can be freely changed during autonomous driving. As a result, in a case in which an occupant has changed their posture during autonomous driving, there is a possibility that the display of the display part may become less visible to the occupant than before the occupant changed their posture. That is, there is room for improvements that suppress the occurrence of situations in which it becomes difficult for an occupant to view information at the display part during autonomous driving.

SUMMARY

An aspect of the present disclosure is a vehicle display device, that includes: a display part having a plurality of display faces that display information and that are provided at at least one location among a front face, a rear face, an upper face or a side face inside a vehicle cabin; a detection part that detects an orientation and a posture of an occupant; and a control part that selects a display face in accordance with the orientation and the posture of the occupant detected by the detection part, and controls display by the display part such that information is displayed at the selected display face.

BRIEF DESCRIPTION OF THE DRAWINGS

Exemplary embodiments of the present disclosure will be described in detail based on the following figures, wherein:

FIG. 4 is an explanatory diagram indicating a state in which an image is displayed at a roof head lining screen according to the first exemplary embodiment;

FIG. 5 is an explanatory diagram indicating a state in which a monitor has risen from a door trim according to the first exemplary embodiment;

FIG. 13 is an explanatory diagram indicating a state in which the screen according to the third exemplary embodiment is supported by a set of rail members;

FIG. 16 is an explanatory diagram indicating a state in which a sensor that detects an occupant is provided at a seat according to a third variant example.

DETAILED DESCRIPTION

First Exemplary Embodiment

Figure 1:
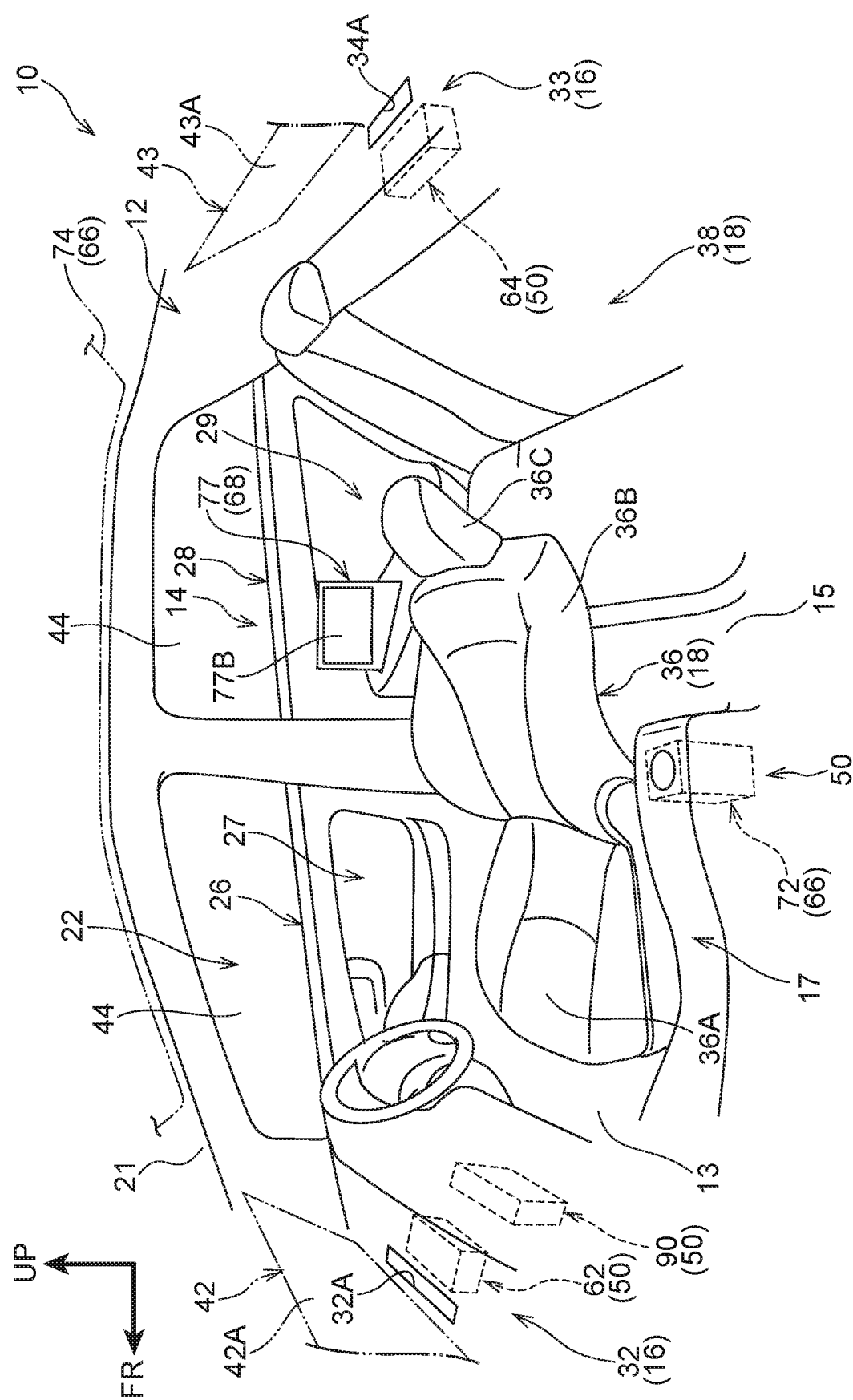
FIG. 1 is an explanatory diagram indicating the configuration of a vehicle cabin interior according to a first exemplary embodiment.

Vehicle 10 and vehicle display device 50 according to a first exemplary embodiment are explained. It should be noted that arrow FR in the drawings indicates a vehicle front direction (direction of travel), the arrow UP indicates upward of the vehicle, the arrow OUT indicates a vehicle width direction outer side, and the arrow IN indicates a vehicle width direction inner side.

[Overall Configuration]

Vehicle 10 shown in FIG. 1 is configured by vehicle body 12, side door 14 as an example of a lateral face, panel part 16, center console 17, seat 18, glass part 22, autonomous driving support part 24 (refer to FIG. 2), and vehicle display device 50. Vehicle body 12 forms vehicle cabin 13, which has floor 15. Further, roof head lining 21 is provided at a vehicle upper part inside vehicle cabin 13 as an example of an upper face. Side door 14 includes front side door 26 and rear side door 28.

Panel part 16 has vehicle front side instrument panel 32 and vehicle rear side upper back panel 33. Center console 17 is provided at the approximate center of floor 15 in the vehicle width direction, and divides floor 15 into a driver's seat side and a front passenger seat side. Seat 18 includes front seat 36 and rear seat 38. Glass part 22 has front windshield glass 42 as an example of a front face, rear windshield glass 43 as an example of a rear face, and side window glass 44.

Door trim 27 is provided at a vehicle width direction inner side of front side door 26. Door trim 29 is provided at a vehicle width direction inner side of rear side door 28. Opening part 32A, open toward front windshield glass 42, is formed at an upper surface of instrument panel 32. Opening part 34A, open toward rear windshield glass 43, is formed at an upper surface of upper back panel 33.

Figure 3:
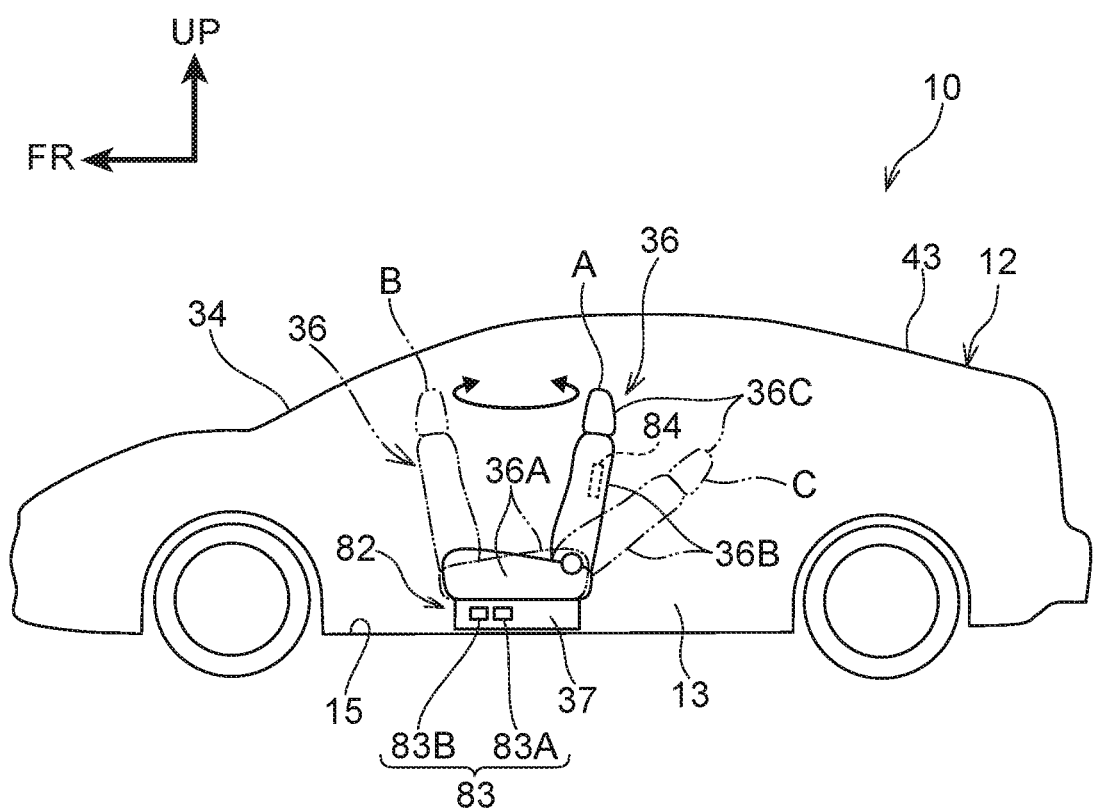
FIG. 3 is an explanatory diagram indicating a state in which the seat of a driver's seat according to the first exemplary embodiment rotates.

Front seat 36 shown in FIG. 3 is designated as the driver's seat of vehicle 10 in the present exemplary embodiment, and is disposed at a front part inside vehicle cabin 13. Further, front seat 36 is configured by seat cushion 36A at which occupant P (refer to FIG. 8) is seated, seat back 36B that provides a backrest for occupant P, and headrest 36C that supports the head of occupant P. In addition, front seat 36 is supported by turntable 37 provided at floor 15.

Turntable 37 is, for example, manually operated, and seat cushion 36A (that is, front seat 36) is rotatable around an axis in a vehicle vertical direction by operation of a lock release lever. Further, turntable 37 can adopt a front-facing state in which front seat 36 faces the vehicle front (the state indicated by solid line A) and a face-to-face state in which front seat 36 faces the vehicle rear (the state indicated by dashed-double-dotted line B).

A lower end part of seat back 36B is connected to a rear end part of seat cushion 36A via a well-known reclining mechanism. That is, seat back 36B is rotatable relative to seat cushion 36A with an axial direction in the vehicle width direction. In this way, the angle of inclination (reclining angle) of seat back 36B relative to seat cushion 36A can be changed as indicated by solid line A and dashed-double-dotted line C.

An occupant seated in front seat 36 in a front-facing state can view the topography in front of vehicle 10 through front windshield glass 34. Further, at a time of autonomous driving, which is discussed below, an occupant seated in front seat 36 in a face-to-face state can view the topography to the rear of vehicle 10 through rear window glass 43.

Figure 2:
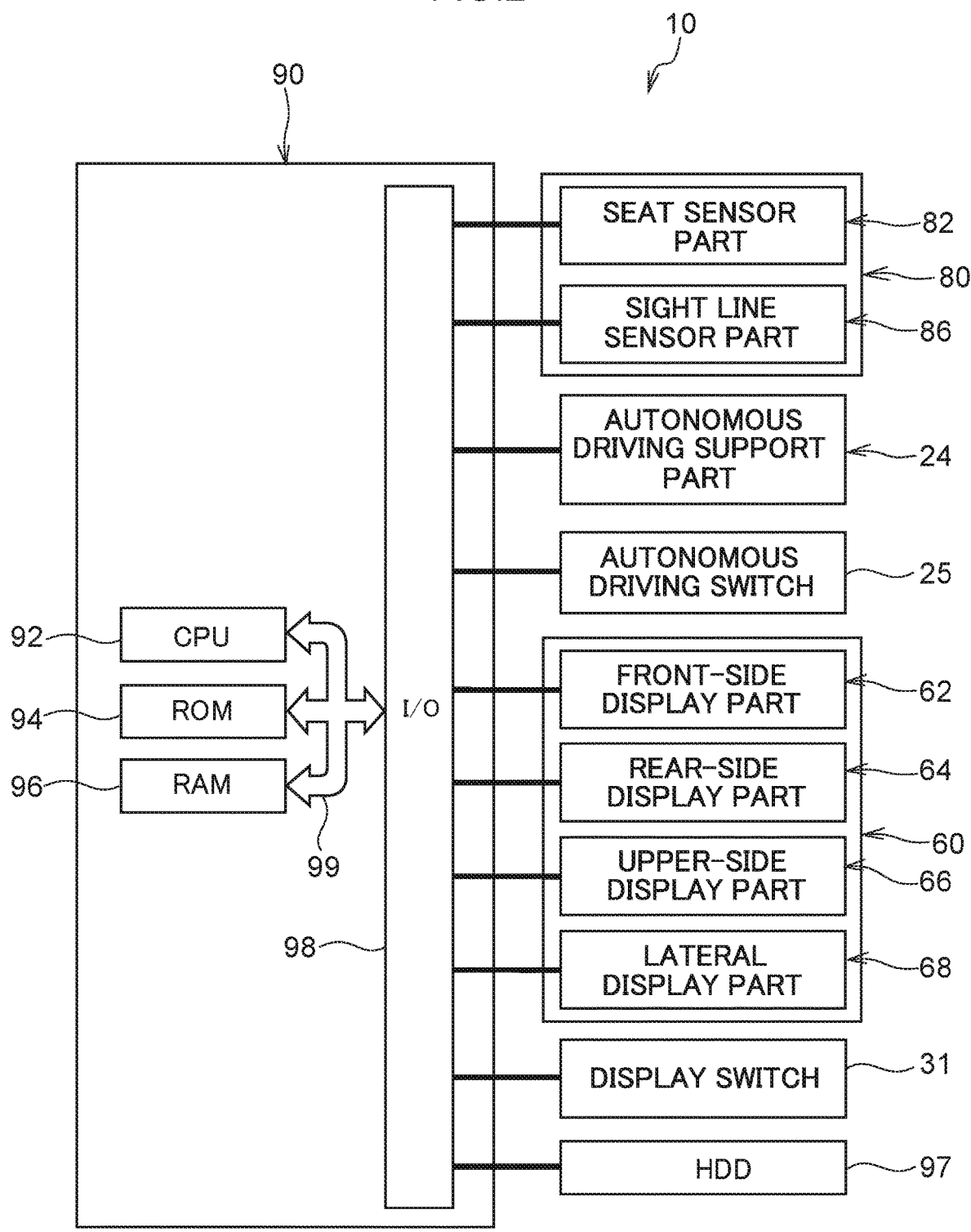
FIG. 2 is a block diagram of a vehicle including the respective components of a vehicle display device according to the first exemplary embodiment.

Autonomous driving support part 24 shown in FIG. 2 is configured, in order to effect autonomous travel of vehicle 10, so as to assess the situation of the host vehicle and the surroundings thereof based on information obtained from various kinds of sensors, and perform autonomous driving control processing that controls, for example, the acceleration amount, the braking amount, and the steering angle. That is, by operation of autonomous driving support part 24, the driving state of vehicle 10 becomes an autonomous driving state. Further, by terminating operation of autonomous driving support part 24, the driving state of vehicle 10 becomes a manual driving state of manual operation by the driver. Initiation and cessation of operation of autonomous driving support part 24 are performed by operation of autonomous driving switch 25 by an occupant.

Autonomous driving switch 25 is provided in a region of instrument panel 32 (refer to FIG. 1) at which it can be operated by an occupant (the driver). Further, autonomous driving switch 25 is configured, as an example, to be turned ON by being pressed and then to be turned OFF by being pressed once more, thereby switching between autonomous driving and manual driving of vehicle 10. Information on an ON state and an OFF state of autonomous driving switch 25 is sent to control part 90, which is described below.

The various kinds of sensors for effecting autonomous travel of vehicle 10 include external sensors and internal sensors. External sensors include at least one of camera, radar or LIDER (Laser Imaging Detection and Ranging) sensors, and detect the situation surrounding vehicle 10. Internal sensors include, for example, at least one of a velocity sensor, an acceleration sensor, or a yaw rate sensor, and detect the vehicle situation, such as the travel state, by detecting various physical quantities at a time of travel of vehicle 10.

Data for image M (refer to FIG. 4), as one example of information to be displayed at the respective display faces, which are described below, is stored at hard disk drive (HDD) 97. Initiation and cessation of operation of display of image M is performed by operation of display switch 31 by an occupant.

Display switch 31 is provided in a region of instrument panel 32 at which it can be operated by an occupant (the driver). Further, display switch 31 is configured, as an example, by an ON button and an OFF button. Display of image M is turned ON by operation of the ON button, while display of image M is turned OFF by operation of the OFF button. Information on an ON state and an OFF state of display switch 31 is sent to control part 90, which is described below.

[Configuration of Main Portion]

Next, vehicle display device 50 is explained.

Vehicle display device 50 shown in FIG. 2 has display part 60, detection part 80, and control part 90. It should be noted that HDD 97 is included in control part 60.

<Display Part>

Display part 60 has, inside vehicle cabin 13 (refer to FIG. 1), front-side display part 62 provided at a front side in a vehicle front-rear direction, rear-side display part 64 provided at a rear side, upper-side display part 66 provided at an upper side in the vehicle vertical direction, and lateral display part 68 provided at one side in the vehicle width direction.

(Front-Side Display Part)

Front-side display part 62 shown in FIG. 1 is accommodated inside instrument panel 32. Specifically, front-side display part 62 is configured by a light source, a lens, a liquid crystal panel, and a reflecting mirror. In the present exemplary embodiment, front windshield glass 42 is included in front-side display part 62. Driving of front-side display part 62 is controlled by control part 90, which is described below.

In front-side display part 62, information can be displayed at display face 42A at the vehicle cabin interior side of front windshield glass 42 by light, which has transmitted through a liquid crystal panel and has been reflected at a reflecting mirror, passing through opening part 32A and being irradiated toward front windshield glass 42. It should be noted that display face 42A is established as a region of front windshield glass 42 that faces front seat 36 in the vehicle front-rear direction. Further, front-side display part 62 is provided such that information displayed at display face 42A can be expanded and contracted by changing the distance between the liquid crystal panel and the lens.

(Rear-Side Display Part)

Rear-side display part 64 is accommodated within upper back panel 33. Specifically, rear-side display part 64 is configured by a light source, a lens, a liquid crystal panel, and a reflecting mirror. It should be noted that, in the present exemplary embodiment, rear windshield glass 43 is included in rear-side display part 64. Driving of rear-side display part 64 is controlled by control part 90, which is described below.

In rear-side display part 64, information can be displayed at display face 43A at the vehicle cabin interior side of rear windshield glass 43 by light, which has transmitted through a liquid crystal panel and has been reflected at a reflecting mirror, passing through opening part 34A and being irradiated toward rear windshield glass 43. It should be noted that display face 43A is established as a region of rear windshield glass 43 that faces front seat 36 in the vehicle front-rear direction. Further, rear-side display part 64 is provided such that information displayed at display face 43A can be expanded and contracted by changing the distance between the liquid crystal panel and the lens.

(Upper-Side Display Part)

Upper-side display part 66 has projector 72, which is provided at center console 17 and projects towards a vehicle upper side, and screen 74, which is one example of a display face provided along roof head lining 21.

Projector 72 is disposed at a lower side of a central height position in the vehicle vertical direction of vehicle cabin 13. Further, projector 72 is configured so as to be able to change the magnification ratio of information displayed at screen 74 in accordance with screen 74. Specifically, projector 72 is provided such that information displayed at screen 74 can be expanded and contracted by changing the distance between lenses in the optical system. Driving of projector 72 is controlled by control part 90, which is described below. In upper-side display part 66, information can be displayed at screen 74 by light from projector 72 being projected onto screen 74.

(Lateral Display Part)

Lateral display part 68 shown in FIG. 5 is, as one example, provided at door trim 29 of rear side door 28. Further, lateral display part 68 has monitor 77 that displays information. Monitor 77 has monitor main body 77A, which is formed in a tablet shape having the vehicle width direction as its thickness direction, and display panel 77B, which is provided at monitor main body 77A and which is one example of a display face at which information is displayed. Further, monitor 77 is provided such that information displayed at display panel 77B can be expanded and contracted by an image engine.

Door trim 29 has main body part 75 provided at an inner panel of rear side door 28, arm rest 76 as one example of a housing part that protrudes outward from main body part 75 toward the interior of vehicle cabin 13, and motion part 78. That is, lateral display part 68, arm rest 76 and motion part 78 are provided at door trim 29.

A hollow space is formed between arm rest 76 and main body part 75. The size of arm rest 76 is such that approximately the entirety of monitor 77 can be accommodated between arm rest 76 and main body part 75. That is, arm rest 76 is formed so as to be capable of accommodating monitor 77. Opening part 76B, which penetrates arm rest 76 in the vehicle vertical direction and is elongated in the vehicle front-rear direction, is formed at upper wall 76A at a vehicle upper side of arm rest 76.

Motion part 78 moves monitor 77. Specifically, motion part 78, as one example, has pinion 78A, which is rotated by a motor, rack 78B, which is formed at an end part in the vehicle front-rear direction of monitor main body 77A, and guide plate 78C, which is provided inside arm rest 76. A tooth part of rack 78B engages with a tooth part of pinion 78A. Guide plate 78C contacts monitor main body 77A such that the direction of movement of monitor main body 77A is along the vehicle vertical direction. As a result, in a case in which pinion 78A is rotated in one direction, motion part 78 moves monitor 77 through opening part 76B of arm rest 76 toward an outer side (a vehicle upper side). Further, in a case in which pinion 78A is rotated in the other direction, motion part 78 moves monitor 77 toward an inner side of arm rest 76.

<Detection Part>

Detection part 80 shown in FIG. 2, as one example, has seat sensor part 82 and sight line sensor part 86. Further, detection part 80 detects the orientation and posture of an occupant seated in front seat 36 (refer to FIG. 1). It should be noted that the orientation of the occupant means the direction in which the occupant is facing. Further, the posture of the occupant means the position of the occupant's body.

(Seat Sensor Part)

Seat sensor part 82 shown in FIG. 3 has, as one example, direction sensor 83 that detects the orientation of an occupant seated in front seat 36, and a well-known incline sensor 84 that detects an angle of inclination of the occupant's upper body relative to the vehicle front-rear direction.

Direction sensor 83, as one example, is configured by detection unit 83A, which is fixed to turntable 37, and detectable member 83B, which is fixed to front seat 36. Detection unit 83A has a light emission part and a light receiving element. Further, detection unit 83A has a configuration that determines whether or not light emitted from the light emission part has been received at the light receiving element based on the output (HIGH, LOW) of the light receiving element.

Detectable member 83B is configured by a metal that reflects light emitted from the light emission part of detection unit 83A. Further, detectable member 83B is fixed to front seat 36 so as to face detection unit 83A in the vehicle front-rear direction in a case in which front seat 36 is facing the vehicle front. As a result, in a case in which front seat 36 is facing the vehicle front, light emitted from the light emission part is reflected by detectable member 83B and received by the light receiving member, whereby the output of direction sensor 83 assumes a HIGH state.

Further, in a case in which front seat 36 is facing the vehicle rear, light emitted from the light emission part of detection unit 83A is not reflected by detectable member 83B. As a result, the output of direction sensor 83 assumes a LOW state. Thus, direction sensor 83 determines that front seat 36 is facing the vehicle front in a case in which the output from detection unit 83A is HIGH, and determines that front seat 36 is facing the vehicle rear in a case in which the output from detection unit 83A is LOW. Information on the orientation of the occupant as detected by direction sensor 83 is sent to control part 90 (refer to FIG. 2), which is described below.

Incline sensor 84, as one example, is provided at seat back 36B. Further, incline sensor 84 is configured to detect the posture of an occupant seated in front seat 36 by detecting the angle of inclination of seat back 36B relative to the vehicle front-rear direction. It should be noted that in the present exemplary embodiment, the posture of the occupant is detected in a state in which the occupant is in contact with seat back 36B. Information on the posture of the occupant as detected by incline sensor 84 is sent to control part 90 (refer to FIG. 2), which is described below.

(Sight Line Sensor Part)

Sight line sensor part 86 shown in FIG. 2, as one example, is configured to numerically quantify the sight line direction of the occupant by analyzing, in real time, the face of the occupant as imaged by plural infrared cameras provided inside vehicle cabin 13 (refer to FIG. 1), and to output this information to control part 90, which is described below. The quantified information on the sight line direction of the occupant corresponds to the information on the occupant's posture. Examples of sight line sensor part 86 include the eye tracking system manufactured by Smart Eye AB. Further, sight line sensor part 86 is configured to detect the sight line of the occupant regardless of the orientation of the occupant (which may be any of the vehicle front, the vehicle rear or a vehicle side).

<Control Part>

Control part 90 is configured by a computer in which central processing unit (CPU) 92, read only memory (ROM) 94, random access memory (RAM) 96, and input-output interface (I/O) 98 are connected to bus 99. Control part 90 controls the driving of each part of vehicle 10, and controls the activation of each part that is electrically connected to control part 90. Autonomous driving support part 24, autonomous driving switch 25, display switch 31, display part 60, detection part 80 and HDD 97 are connected to control part 90 via I/O 98.

Further, programs that are processed based on the flowchart described below (refer to FIG. 7) are installed at control part 90. Control part 90 selects a display face (any one of display faces 42A, 43A, screen 74 and display panel 77B (refer to FIG. 1)) in accordance with the orientation and posture of the occupant detected by detection part 80, and controls display by display part 60 such that information is displayed at the selected display face. Here, the positional relationships between the occupant and each of the display faces in vehicle 10 are explained.

Figure 6A:
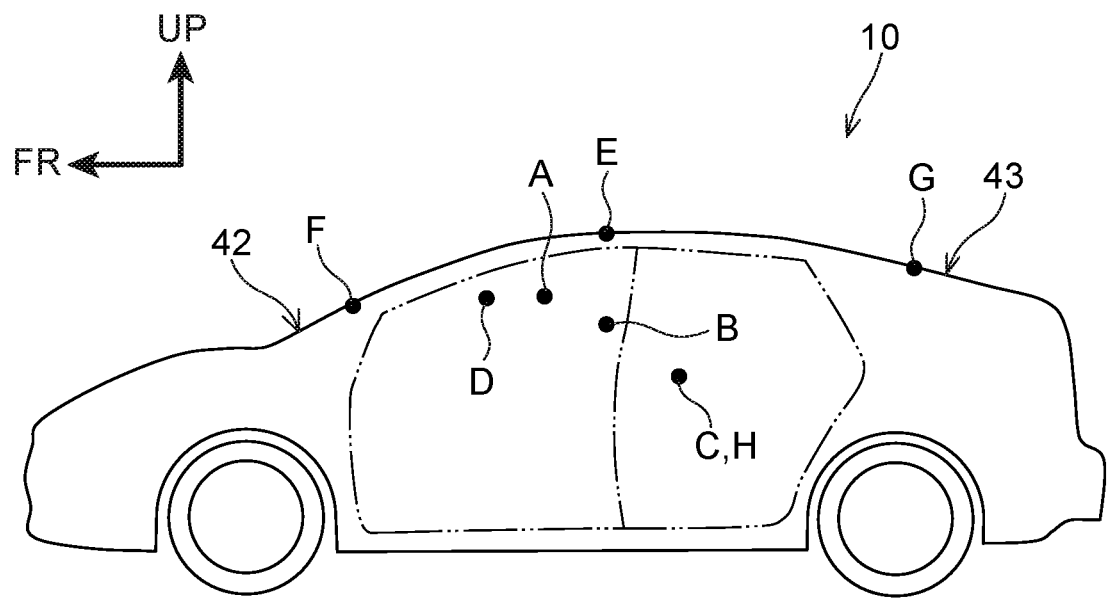
FIG. 6A is an explanatory diagram indicating positions of respective parts of the vehicle according to the first exemplary embodiment, in lateral view.
Figure 6B:
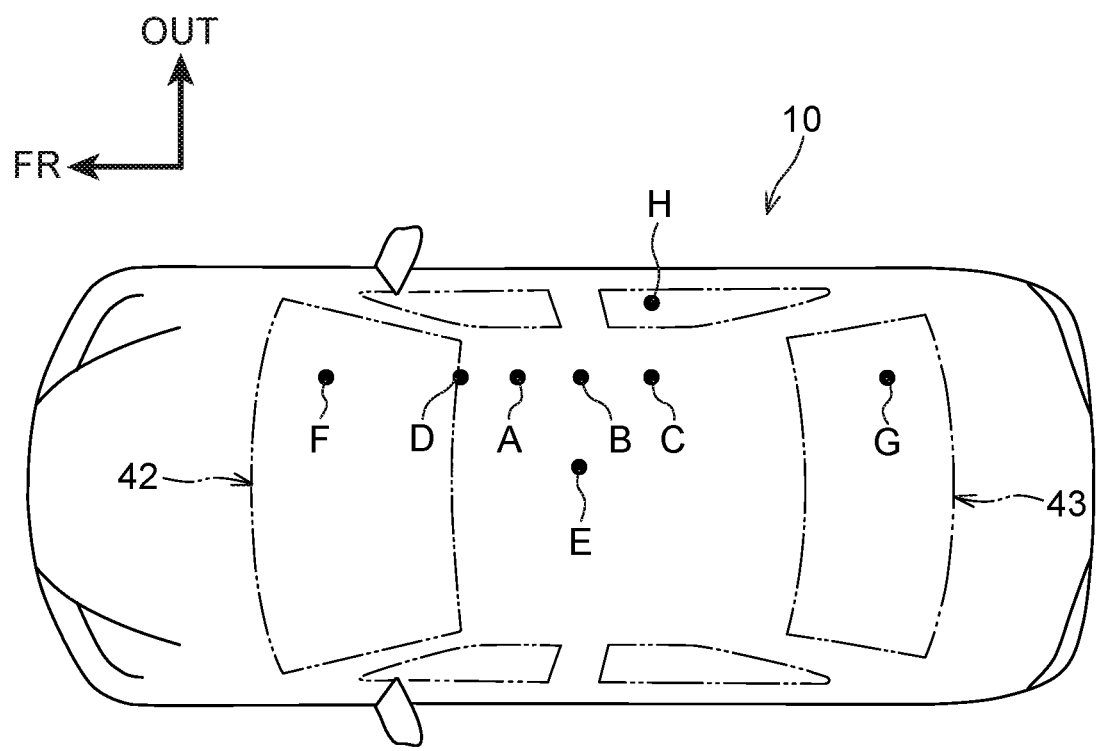
FIG. 6B is an explanatory diagram indicating positions of respective parts of the vehicle according to the first exemplary embodiment, in plan view.

In vehicle 10 shown in FIG. 6A and FIG. 6B, as one example, virtual positions A, B, C, D, E, F, G and H are established. Three-dimensional coordinate information for virtual positions A, B, C, D, E, F, G and H is stored in advance in control part 90 (refer to FIG. 2).

Position A is set as a central position between the eyes of an occupant seated in front seat 36, in a state in which front seat 36 (refer to FIG. 3) is facing the vehicle front and seat back 36B (refer to FIG. 3) is not reclined. It should be noted that the body type of the occupant, as one example, is set in advance based on the average height of a Japanese person. Position B is set as a central position between the eyes of an occupant seated in front seat 36, in a state in which front seat 36 is facing the vehicle front and seat back 36B is reclined, by one step, toward the vehicle rear.

Position C is set as a central position between the eyes of an occupant seated in front seat 36, in a state in which front seat 36 is facing the vehicle front and seat back 36B is more extensively reclined (by two steps) toward the vehicle rear. Position D is set as a central position between the eyes of an occupant seated in front seat 36, in a state in which front seat 36 is facing the vehicle rear and seat back 36B is not reclined.

Position E is set as a position at an intersection between screen 74 (refer to FIG. 1) and an optical axis of light emitted from projector 72 (refer to FIG. 1). Position F is set as a central position of display face 42A (refer to FIG. 1). Position G is set as a central position of display face 43A (refer to FIG. 1). Position H is set as a central position of display panel 77B (refer to FIG. 1).

Combinations of the respective positions that can be assumed by an occupant seated in front seat 36, and positions at which the information display faces are most easily visible, are set in advance at control part 90 (refer to FIG. 2). As one example, position F is set relative to position A, position E relative to position B, position E or position H relative to position C, and position G relative to position D. It should be noted that as regards which of position E and position H to select as the position that is most easily visible relative to position C, this is determined based on a detection result from sight line sensor part 86 (refer to FIG. 2). That is, in a case in which it is detected that the occupant is looking toward the top of the vehicle, position E is selected. Further, in a case in which it is detected that the occupant is looking toward the side of the vehicle (toward the right side, as one example), position H is selected.

Further, a program that effects control so as to expand or contract the information (an image, as one example) to be displayed at a display face in accordance with the distance between the selected display face and the occupant's head, is installed at control part 90. In the present exemplary embodiment, as one example, in a case in which the occupant's head is positioned at position B relative to position E, control part 90 effects control so as to display the image at screen 74 (refer to FIG. 1) at normal magnification (actual size). Further, in a case in which the occupant's head is positioned at position C relative to position E, control part 90 effects control so as to display the image at screen 74 at an enlarged magnification (for example, magnified by a factor of 1.2).

In addition, regarding monitor 77 shown in FIG. 5, a program that effects control so as to move display panel 77B to the outside of arm rest 76 in a case in which display panel 77B of monitor 77 accommodated in arm rest 76 is selected, is installed in control part 90 (refer to FIG. 2). Further, a program that effects control so as to move display panel 77B to the inside of arm rest 76 in a case in which display panel 77B of monitor 77 is not selected, is installed in control part 90.

[Mechanism and Effect]

Figure 7:
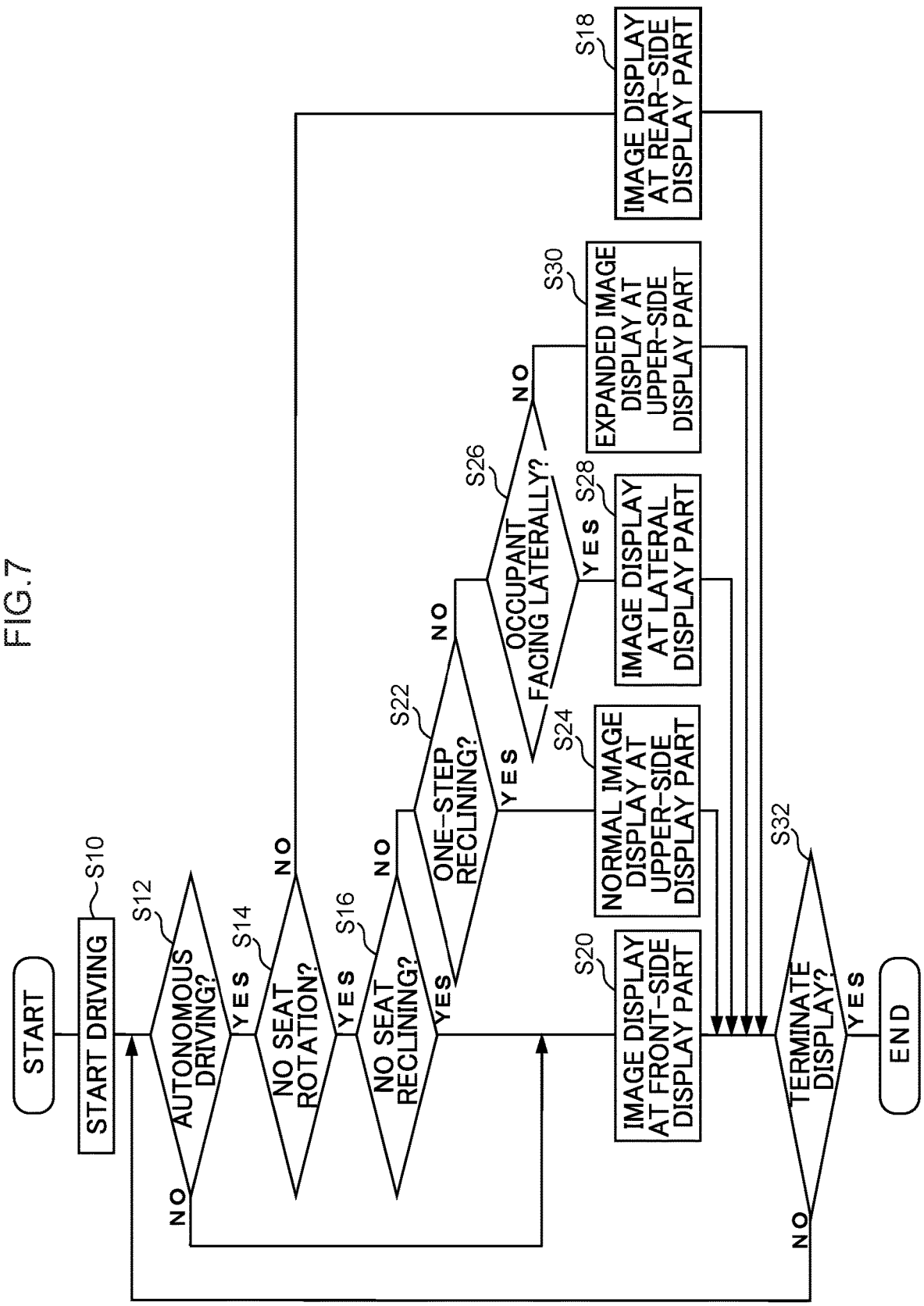
FIG. 7 is a flowchart indicating a processing flow according to which respective display parts of the vehicle display device according to the first exemplary embodiment are selected.

Next, the mechanism and effect of vehicle display device 50 of the first exemplary embodiment are explained using the flowchart of FIG. 7. It should be noted that reference is made to FIG. 1, FIG. 2, FIG. 3, FIG. 4, FIG. 5, FIG. 6A and FIG. 6B regarding the reference numerals for each part of vehicle 10.

In step S10, commencement of driving of vehicle 10 by operation of an accelerator is detected by control part 90, and the flow proceeds to step S12.

In step S12, control part 90 determines whether autonomous driving switch 25 is ON or OFF. In a case in which autonomous driving switch 25 is in an ON state (a state of autonomous driving), the flow proceeds to step S14. Further, in a case in which autonomous driving switch 25 is in an OFF state (a state of manual driving), the flow proceeds to step S20.

In step S14, control part 90 determines whether or not front seat 36 has been rotated, based on a detection result from detection part 80 (direction sensor 83). In a case in which front seat 36 has not been rotated, it is determined that occupant P is looking toward the vehicle front, and the flow proceeds to step S16. Further, in a case in which front seat 36 has been rotated, it is determined that occupant P s looking toward the vehicle rear, and the flow proceeds to step S18.

In step S16, control part 90 determines whether or not front seat 36 has been reclined, based on a detection result from detection part 80 (incline sensor 84). In a case in which front seat 36 has not been reclined, the flow proceeds to step S20. Further, in a case in which front seat 36 has been reclined, the flow proceeds to step S22.

Figure 8:
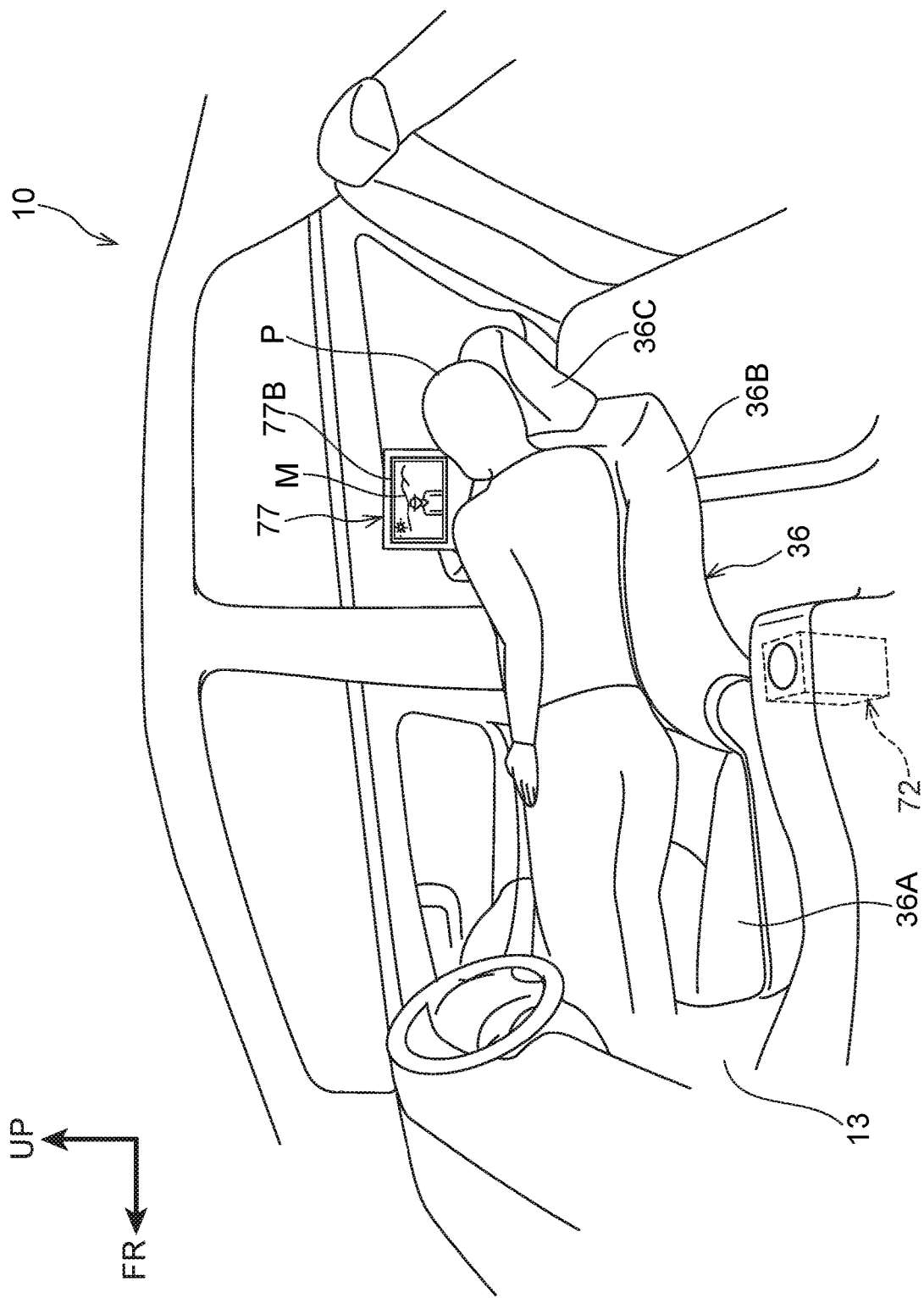
FIG. 8 is an explanatory diagram indicating a state in which an occupant, reclining in the vehicle cabin interior according to the first exemplary embodiment, is viewing a monitor.
Figure 9A:
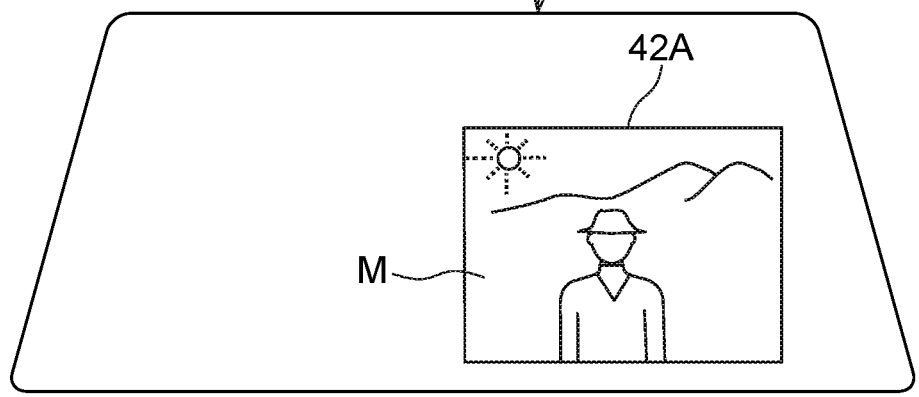
FIG. 9A is an explanatory diagram indicating a state in which an image is displayed at the front windshield glass according to the first exemplary embodiment.
Figure 9B:
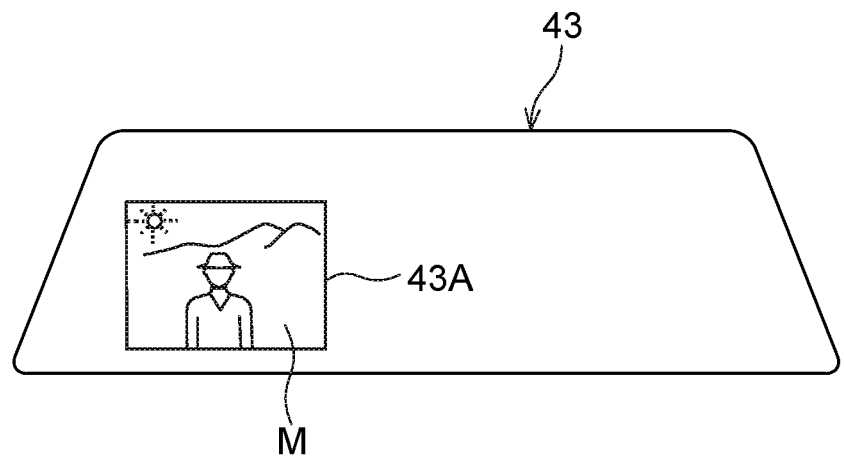
FIG. 9B is an explanatory diagram indicating a state in which an image is displayed at the rear windshield glass according to the first exemplary embodiment.

In step S18, image M is displayed at display face 43A shown in FIG. 9B. Image M displayed at display face 43A is viewed by occupant P (refer to FIG. 8) seated in front seat 36. Further, the flow proceeds to step S32 shown in FIG. 7.

In step S20, image M is displayed at display face 42A shown in FIG. 9A. Image M displayed at display face 42A is viewed by occupant P seated in front seat 36. Further, the flow proceeds to step S32 shown in FIG. 7.

In step S22, control part 90 determines whether front seat 36 has been reclined by one step or by two steps toward the vehicle rear, based on a detection result from incline sensor 84. In a case in which front seat 36 has been reclined by one step, the flow proceeds to step S24. Further, in a case in which front seat 36 has been reclined by two steps, the flow proceeds to step S26.

In step S24, image M is displayed at screen 74 shown in FIG. 4. Image M displayed at screen 74 is viewed by occupant P seated in front seat 36 that has been reclined by one step. Further, the flow proceeds to step S32 shown in FIG. 7.

In step S26, control part 90 determines whether or not occupant P is facing laterally, based on a detection result from sight line sensor part 86. In a case in which occupant P is determined to be facing laterally, the flow proceeds to step S28. Further, in a case in which occupant P is determined not to be facing laterally (i.e., is facing upward), the flow proceeds to step S30.

Figure 9C:
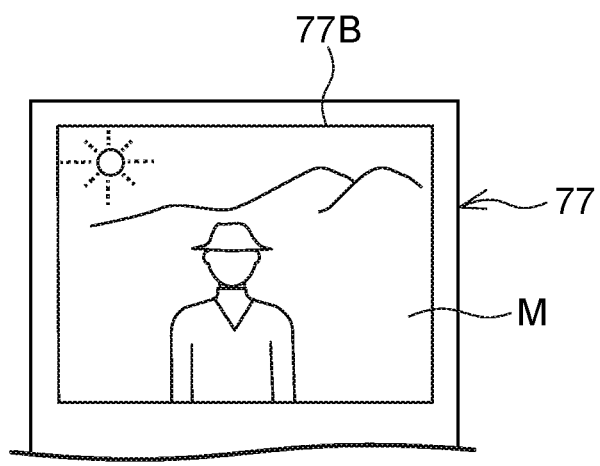
FIG. 9C is an explanatory diagram indicating a state in which an image is displayed at a door trim monitor according to the first exemplary embodiment.

In step S28, image M is displayed at display panel 77B shown in FIG. 9C. Further, as shown in FIG. 8, image M displayed at display panel 77B is viewed by occupant P, who is lying, facing laterally, on front seat 36, which has been reclined by two steps. Further, the flow proceeds to step S32 shown in FIG. 7.

In step S30, image M, which has been expanded from its normal size by a factor of 1.2, is displayed at screen 74 shown in FIG. 4. Image M displayed, thus expanded, at screen 74 is viewed by occupant P, who is lying on front seat 36, which has been reclined by two steps. Further, the flow proceeds to step S32 shown in FIG. 7.

In step S32, it is determined whether or not to end the display of image M. Specifically, in a case in which display switch 31 is in an ON state, the determination is made to continue the display and the flow proceeds to step S12. Further, in a case in which display switch 31 is in an OFF state, the determination is made to end the display, and the program is ended.

As explained in the foregoing, in vehicle display device 50, detection part 80 detects the orientation and posture of occupant P. Further, control part 90 selects a display face in accordance with the orientation and posture of occupant P detected by detection part 80, and controls display by display part 60 such that information is displayed at the selected display face. As a result, since occupant P can view the information (image M, as one example) at a display face corresponding to the occupant's orientation and posture, it is possible to suppress the occurrence of situations in which it becomes difficult for occupant P to view image M at display part 60 during autonomous driving.

Further, in vehicle display device 50, control part 90 effects control so as to expand (or contract, in a case of returning to normal size) image M displayed at a display face in accordance with the distance between the selected display face and the occupant's head. As a result, since occupant P can view image M in the most easily visible position at the most easily visible size, it is possible to further suppress the occurrence of situations in which it becomes difficult for occupant P to view the information at display part 60.

In addition, in vehicle display device 50, owing to projector 72 being made able to alter the magnification ratio of image M displayed at the selected screen 74, there is no need to move projector 72 in the direction of projection (the vehicle vertical direction) relative to screen 74. As a result, compared to a case in which projector 72 is movably configured, it is possible to provide display part 60 with a simple configuration.

In addition, in vehicle display device 50, in a case in which image M is displayed at display panel 77B, control part 90 moves display panel 77B to the outside of arm rest 76. Here, in a case in which image M is not displayed at display panel 77B, display panel 77B is accommodated inside arm rest 76. As a result, in cases in which occupant P is not viewing image M, it is possible to suppress the occurrence of situations in which display panel 77B becomes an obstacle to occupant P (for example, the kind of obstacle whereby, owing to the arm of occupant P contacting display panel 77B when occupant P moves his/her arm, the possible range of motion of the arm is restricted).

Further, in vehicle display device 50, since display part 60 (monitor 77), arm rest 76, and motion part 78 are provided at door trim 29, which is an existing furnishing, there is no need to newly provide furnishings for installing display part 60 inside vehicle cabin 13.

Second Exemplary Embodiment

Next, vehicle display device 100 according to a second exemplary embodiment is explained. It should be noted that members, regions and processing that are basically identical to those in the first exemplary embodiment described above are assigned the same reference numerals as in the first exemplary embodiment and explanation thereof is omitted.

Figure 10A:
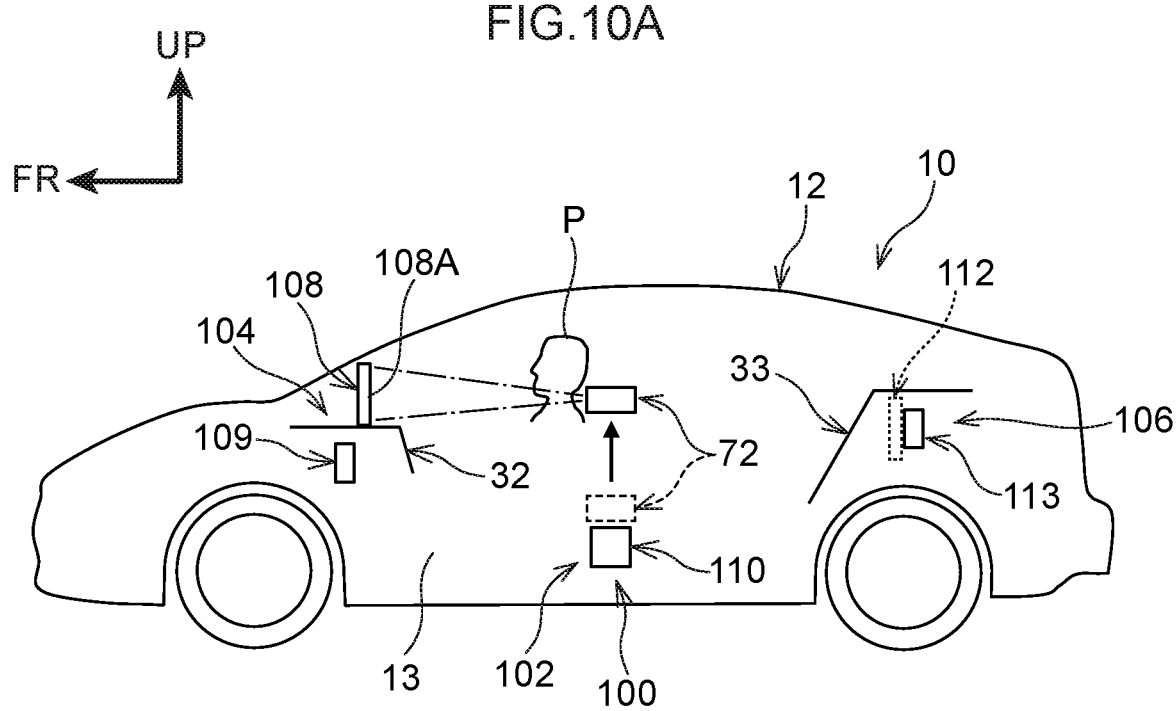
FIG. 10A is an explanatory diagram indicating a state in which an occupant is viewing a screen at the vehicle front in a vehicle display device according to a second exemplary embodiment.

Vehicle display device 100 according to the second exemplary embodiment shown in FIG. 10A has a configuration in which display part 102 is provided, instead of display part 60 in vehicle display device 50 (refer to FIG. 2) in the first exemplary embodiment. Explanation of the configuration other than display part 102 is omitted because it is basically a similar configuration to that of vehicle display device 50.

Display part 102, as one example, has, inside vehicle cabin 13, front-side display part 104, which is provided at a front side in the vehicle front-rear direction, rear-side display part 106, which is provided at a rear side, projector 72, and support part 110, which supports projector 72.

(Front-Side Display Part)

Front-side display part 104 is provided at instrument panel 32. Specifically, front-side display part 104 has screen plate 108, at which information is displayed (projected), and vertical movement part 109, which raises and lowers screen plate 108 in the vehicle vertical direction through opening part 32A (refer to FIG. 1). It should be noted that the location at which opening part 32A is formed differs from that in the first exemplary embodiment, and is disposed at a central part of instrument panel 32 in the vehicle width direction.

Screen plate 108 has display face 108A, which is viewed by occupant P facing the vehicle front in a case in which screen plate 108 has been raised. Further, screen plate 108 is accommodated inside instrument panel 32 in a case in which screen plate 108 has been lowered. In addition, a rack is formed at screen plate 108.

Vertical movement part 109 is provided with a motor, and with a pinion that engages with the rack of screen plate 108. Further, operation of vertical movement part 109 is controlled by control part 90 (refer to FIG. 2). The present exemplary embodiment is configured such that, as one example, in a case in which detection part 80 (refer to FIG. 2) has detected that occupant P is looking toward the vehicle front, control part 90 activates vertical movement part 109 and screen plate 108 is raised upward (or is maintained in a raised state). Further, in a case in which detection part 80 has detected that occupant P is looking toward the vehicle rear, control part 90 activates vertical movement part 109 and screen plate 108 is lowered (or maintained in a lowered state).

(Rear-Side Display Part)

Rear-side display part 106 is provided at upper back panel 33. Specifically, rear-side display part 106 has screen plate 112, at which information is displayed (projected), and vertical movement part 113, which raises and lowers screen plate 112 in the vehicle vertical direction through opening part 34A (refer to FIG. 1). It should be noted that the location at which opening part 34A is formed differs from that in the first exemplary embodiment, and is disposed at a central part of upper back panel 33 in the vehicle width direction.

Screen plate 112 has display face 112A, which is viewed by occupant P facing the vehicle rear in a case in which screen plate 112 has been raised. Further, screen plate 112 is accommodated inside upper back panel 33 in a case in which screen plate 112 has been lowered. In addition, a rack is formed at screen plate 112.

Vertical movement part 113 is provided with a motor, and with a pinion that engages with the rack of screen plate 112. Further, operation of vertical movement part 113 is controlled by control part 90 (refer to FIG. 2). The present exemplary embodiment is configured such that, as one example, in a case in which detection part 80 (refer to FIG. 2) has detected that occupant P is looking toward the vehicle rear, control part 90 activates vertical movement part 113 and screen plate 112 is raised upward (or is maintained in a raised state). Further, in a case in which detection part 80 has detected that occupant P is looking toward the vehicle front, control part 90 activates vertical movement part 113 and screen plate 112 is lowered (or maintained in a lowered state).

(Support Part)

Support part 110, as one example, is configured by a stand, a motor for rotation, and a motor for vertical movement. The stand is configured by a plate member of a size that enables projector 72 to be mounted thereon, and plural truncated conical cylinder-shaped members that are disposed concentrically, that raise and lower the plate member in the vehicle vertical direction, and that are rotatable with the vehicle vertical direction as an axial direction. Operation of the motor for rotation and operation of the motor for vertical movement is controlled by control part 90 (refer to FIG. 2). Further, in a state in which projector 72 is mounted on the stand, support part 110 changes the projection direction of projector 72 to the vehicle front or the vehicle rear by operation of the motor for rotation. Further, in a state in which projector 72 is mounted on the stand, support part 110 changes the projection height of projector 72 by operation of the motor for vertical movement.

Projector 72 in the second exemplary embodiment is capable of projection that is aligned with the position of screen plate 108 or the position of screen plate 112, by operation of support part 110. Further, projector 72 is configured to be capable of changing the magnification ratio (display magnification ratio) of information displayed at screen plate 108 and screen plate 112. Compared to the distance between occupant P's head and screen plate 108, the distance between occupant P's head and screen plate 112 is greater. As a result, information displayed at screen plate 112, as one example, is displayed at a size that is expanded by a factor of 1.2 compared to the information displayed at screen plate 108.

[Mechanism and Effect]

Next, the mechanism and effect of vehicle display device 100 of the second exemplary embodiment are explained.

As shown in FIG. 10A, in a case of autonomous driving in which occupant P is facing the vehicle front, vertical movement part 109 raises screen plate 108. Further, support part 110, while supporting projector 72, raises and rotates projector 72 to face the vehicle front. Further, image M is projected by projector 72 onto screen plate 108 at actual size magnification (1.0) in accordance with the distance between occupant P and screen plate 108. As a result, occupant P, facing the vehicle front, can view image M at display face 108A.

Figure 10B:
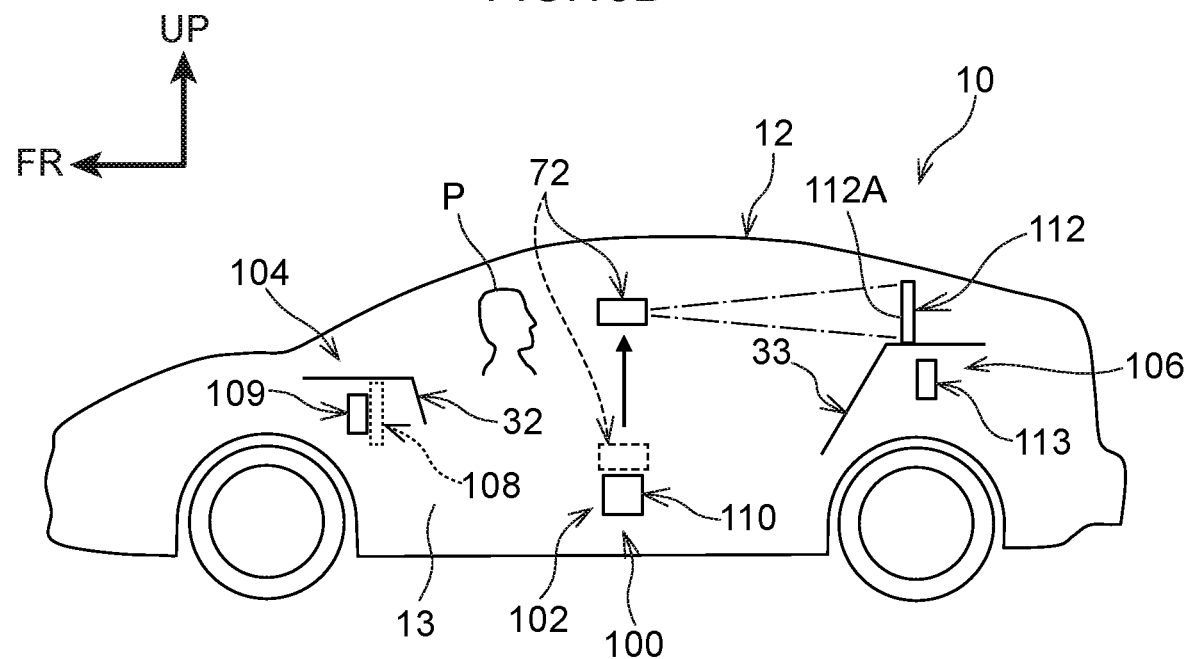
FIG. 10B is an explanatory diagram indicating a state in which an occupant is viewing a screen at the vehicle rear in the vehicle display device according to the second exemplary embodiment.

As shown in FIG. 10B, in a case of autonomous driving in which occupant P is facing the vehicle rear, vertical movement part 113 raises screen plate 112. Further, support part 110, while supporting projector 72, raises and rotates projector 72 to face the vehicle rear. Further, image M is projected by projector 72 onto screen plate 112 at a magnification ratio adjusted by a factor of 1.2 in accordance with the distance between occupant P and screen plate 112. As a result, occupant P, facing the vehicle rear, can view image M at display face 112A.

In vehicle display device 100, detection part 80 (refer to FIG. 2) detects the orientation and posture of occupant P. Further, control part 90 (refer to FIG. 2) selects a display face in accordance with the orientation and posture of occupant P detected by detection part 80, and controls display by display part 102 such that information (image M) is displayed at the selected display face. As a result, since occupant P can view the information at a display face corresponding to the occupant's own orientation and posture, it is possible to suppress the occurrence of situations in which it becomes difficult for occupant P to view image M at display part 102 during autonomous driving.

Third Exemplary Embodiment

Next, vehicle display device 120 according to a third exemplary embodiment is explained. It should be noted that members, regions and processing that are basically identical to those in the first and second exemplary embodiments described above are assigned the same reference numerals as in the first and second exemplary embodiments and explanation thereof is omitted.

Figure 11:
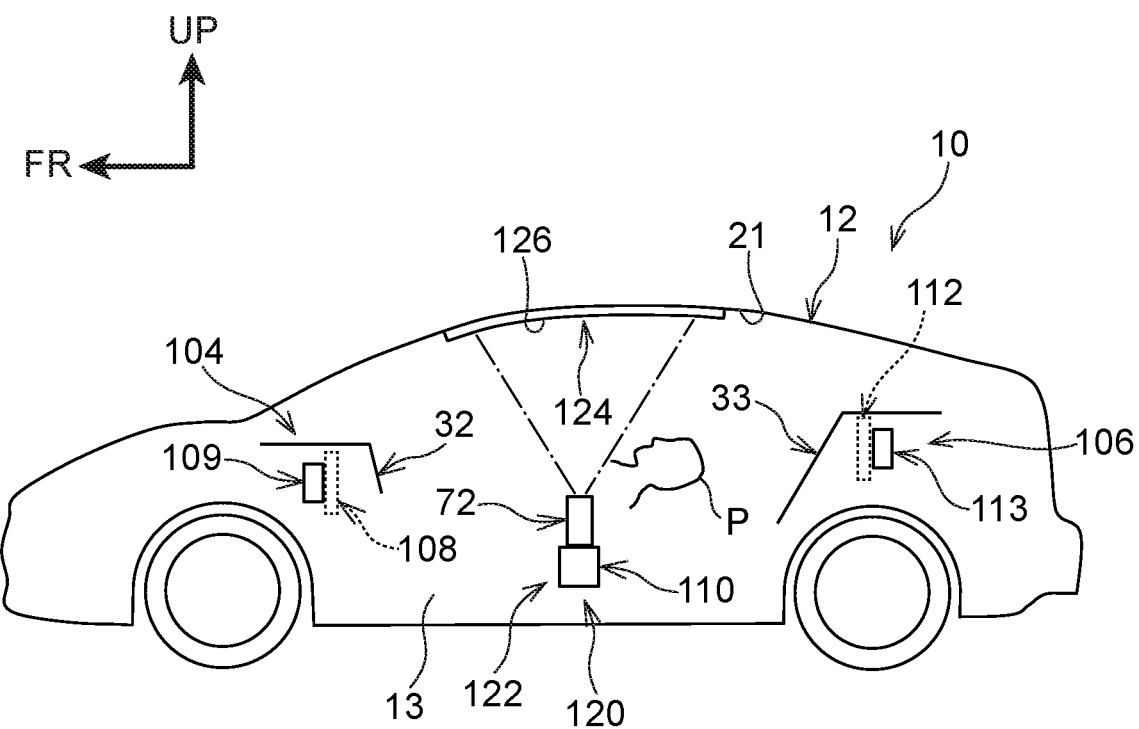
FIG. 11 is an explanatory diagram indicating a state in which an occupant is viewing a roof head lining screen in a vehicle display device according to a third exemplary embodiment.

Vehicle display device 120 according to the third exemplary embodiment shown in FIG. 11 has a configuration in which display part 122 is provided instead of display part 102 in vehicle display device 100 (refer to FIG. 10A) in the second exemplary embodiment. Explanation of the configuration other than display part 122 is omitted because it is basically a similar configuration to that of vehicle display device 100.

Display part 122, as one example, has front-side display part 104, rear-side display part 106, projector 72, support part 110, and upper-side display part 124, which is provided at roof head lining 21. It should be noted that support part 110 is provided with a motor for inclination that changes the angle of the plate member on which projector 72 is mounted, so as to enable projector 72 to project image M (refer to FIG. 12) toward upper-side display part 124.

Figure 12:
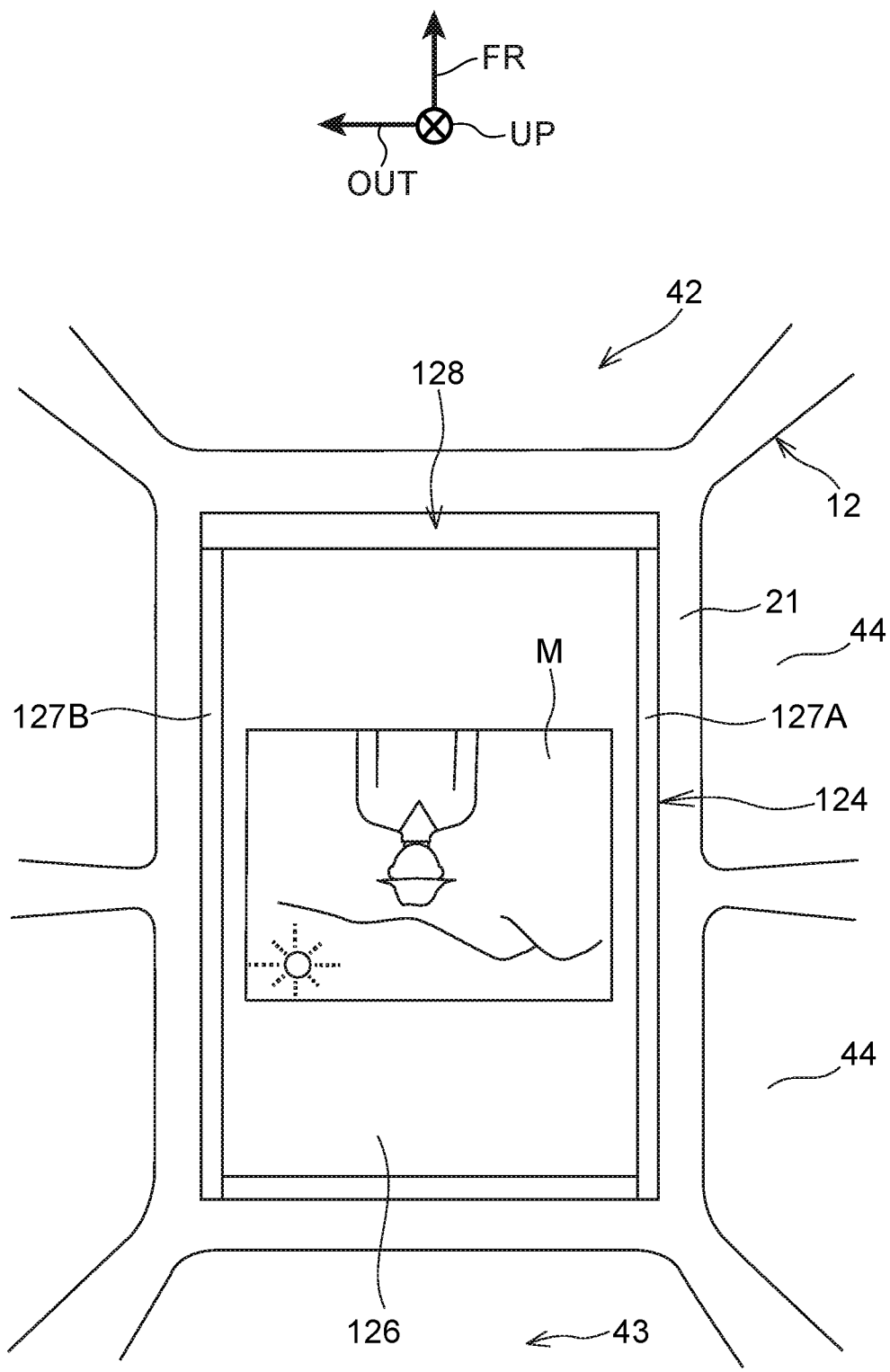
FIG. 12 is an explanatory diagram indicating the roof head lining screen according to the third exemplary embodiment.

Upper-side display part 124 shown in FIG. 12, as one example, has screen 126, guide rails 127A, 127B that guide screen 126, and screen movement part 128 that is configured to be capable of deploying and retracting screen 126.

Screen 126, in a case of being viewed from a vertical direction in a deployed state, is formed in a rectangular shape having the vehicle front-rear direction as its longitudinal direction and the vehicle width direction as its transverse direction. Further, screen 126 extends from the vicinity of front windshield glass 42 to the vicinity of rear windshield glass 43. In addition, screen 126 is disposed along roof head lining 21 in a deployed state.

Guide rails 127A, 127B are provided at roof head lining 21 so as to be spaced apart in the vehicle width direction, and extend in the vehicle front-rear direction. Further, as shown in FIG. 13, guide rails 127A, 127B have a cross sectional shape that is formed in a substantial U-shape as viewed from the vehicle front-rear direction, and are disposed in a state in which the open sides of their cross sections face each other in the vehicle width direction. Guide rail 127A supports one end part of screen 126 in the vehicle width direction. Guide rail 127B supports the other end part of screen 126 in the vehicle width direction. It should be noted that owing to guide rails 127A, 127B being provided along roof head lining 21, screen 126, as one example, is disposed in a curved state in which a central part of screen 126 in the vehicle front-rear direction is positioned further toward the vehicle upper side than the front end part and rear end part thereof.

Projector 72 of the third exemplary embodiment shown in FIG. 11 has an image engine. This image engine is configured to perform image correction processing such that, in a case in which screen 126 disposed in a curved state is being viewed, an image displayed at screen 126 is viewed in a flat state.

[Mechanism and Effect]

Next, the mechanism and effect of vehicle display device 120 of the third exemplary embodiment are explained.

In vehicle display device 120 shown in FIG. 11, in a case in which occupant P is looking toward the vehicle front, screen plate 108 is raised and an image is displayed at screen plate 108. Further, in a case in which occupant P is looking toward the vehicle rear, screen plate 112 is raised and an image is displayed at screen plate 112.

In addition, in a case in which front seat 36 (refer to FIG. 1) is in a two-step reclined state and occupant P is looking toward the top of the vehicle, the retracted screen 126 is deployed by screen movement part 128 (refer to FIG. 12), and covers the vehicle cabin side of roof head lining 21. Further, projector 72 is disposed facing screen 126 by support part 110, and image M (refer to FIG. 12) is projected onto screen 126. As a result, occupant P, facing the top of the vehicle, can view image M at screen 126.

In short, in vehicle display device 120, detection part 80 (refer to FIG. 2) detects the orientation and posture of occupant P. Further, control part 90 (refer to FIG. 2) selects a display face in accordance with the orientation and posture of occupant P detected by detection part 80, and controls display by display part 122 such that information (image M) is displayed at the selected display face. As a result, since occupant P can view the information at a display face corresponding to the occupant's own orientation and posture, it is possible to suppress the occurrence of situations in which it becomes difficult for occupant P to view image M at display part 122 during autonomous driving.

The present disclosure is not limited to the exemplary embodiments described above.

First Variant Example

Figure 14:
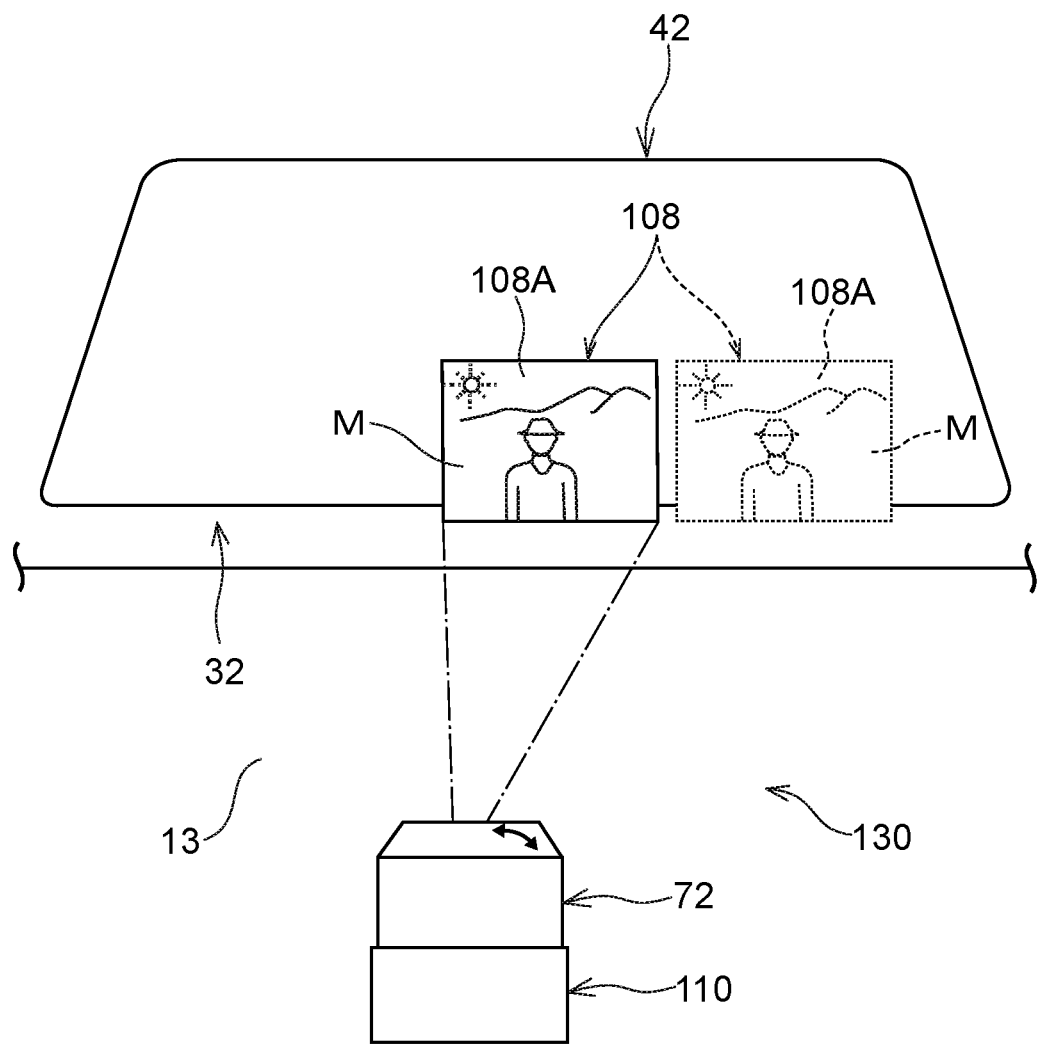
FIG. 14 is an explanatory diagram indicating a state in which two display faces are established at the front windshield glass in a vehicle display device according to a first variant example.

As shown in FIG. 14, vehicle display device 130 may be used, in which screen plate 108 is provided, so as to be movable in the vehicle width direction, at only one location: at front windshield glass 42 at the vehicle front. Vehicle display device 130 is configured such that screen plate 108 moves in the vehicle width direction so as to correspond to the sight line of an occupant, and such that the projection direction of projector 72 toward the moved screen plate 108 is changed by support part 110. It should be noted that display face 108A before being moved and display face 108A after being moved are included among plural display faces. In this way, by changing the display face so as to correspond to the sight line of an occupant, in a configuration that has plural display faces at only one location inside vehicle cabin 13, it is possible to suppress the occurrence of situations in which it becomes difficult for an occupant to view information during autonomous driving.

Second Variant Example

Figure 15:
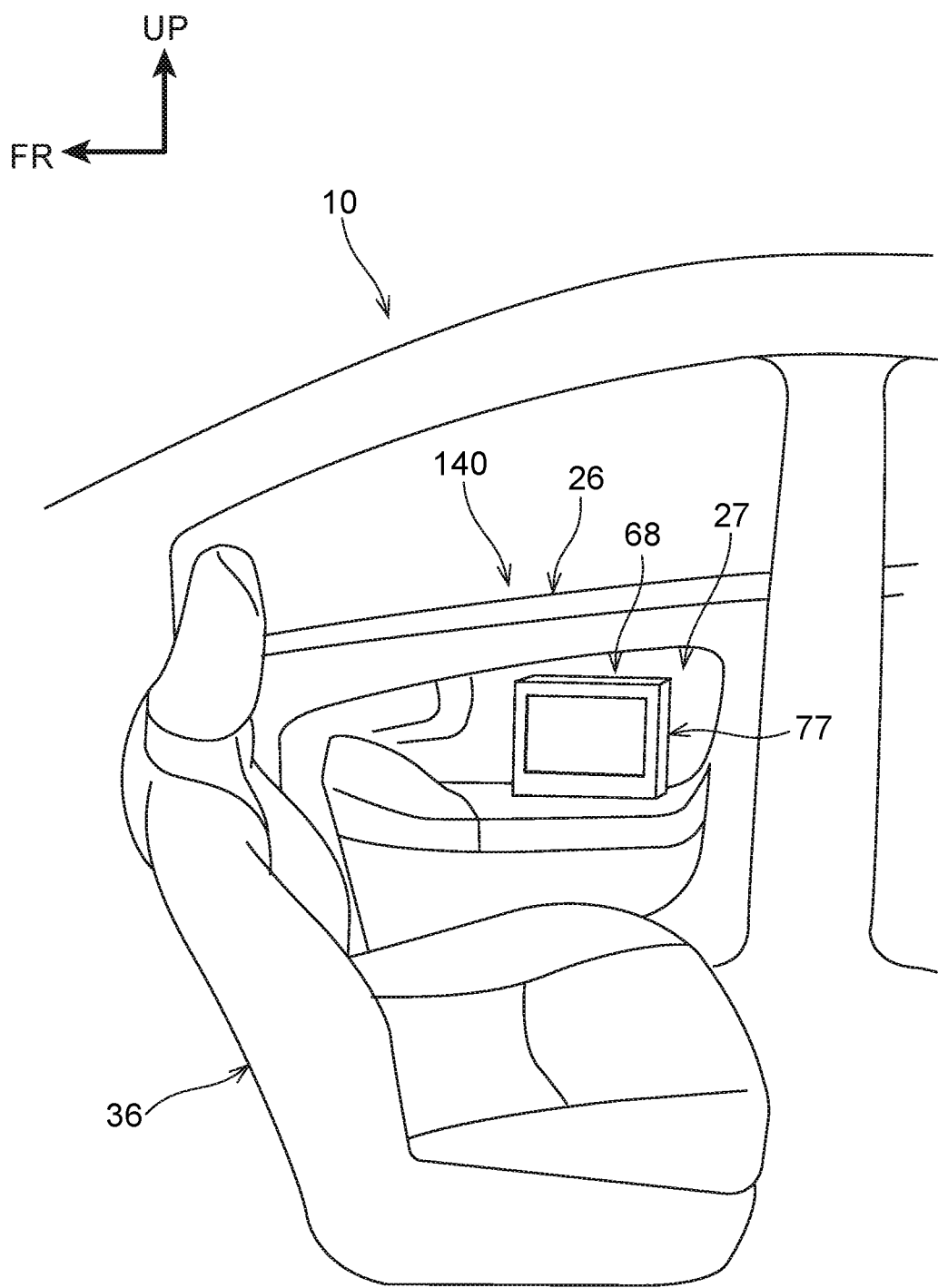
FIG. 15 is an explanatory diagram indicating a state in which a monitor is provided at the door trim of the driver's seat in a vehicle display device according to a second variant example.

As shown in FIG. 15, vehicle display device 140 may be used, in which lateral display part 68 is provided in door trim 27 of front side door 26. In a state in which front seat 36 is disposed facing the vehicle rear, an occupant can view information at monitor 77 in door trim 27, which is the closest location.

Third Variant Example

Detection of an occupant's posture is not limited to detection by sight line sensor part 86 (refer to FIG. 2). For example, as shown in FIG. 16, vehicle display device 150 may be used, in which plural pressure sensors 152 are disposed in front seat 36. Specifically, in seat cushion 36A, plural pressure sensors 152 are disposed at intervals in the vehicle front-rear direction and in the vehicle width direction. In addition, in seat back 36B, plural pressure sensors 152 are disposed at intervals in the vehicle vertical direction and in the vehicle width direction. Further, based on differences in pressure measured by pressure sensors 152, a determination may be made as to whether an occupant is, for example, facing the front, is facing the side, is hunched forward, or is leaning back against seat back 36B.

Other Variant Examples

Information displayed at the respective display faces may be any of text, graphics or photographs and, further, may be either of moving images or still images. Further, information displayed at the respective display faces is not limited to the projected image M and may be, for example, information displayed at an electronic signboard or a picture attached to a message board. Front seat 36 is not limited to the driver's seat and may be the front passenger seat.

In vehicle display device 50, screen plates 108, 112 may be provided and information may be displayed at screen plates 108, 112 without displaying information at front windshield glass 42 or rear windshield glass 43. Further, in vehicle display device 50, the magnification ratio of image M displayed at screen 74 is not limited to a factor of 1.2, and may be another magnification ratio. In addition, instead of displaying image M at screen 74 at an enlarged magnification, image M may be displayed at the same, normal, magnification ratio. Furthermore, in vehicle display device 50, pressure sensors 152 may be provided at front seat 36 and the position of occupant P's head detected, and information displayed at display panel 77B may be expanded or contracted in accordance with the distance between occupant P's head and monitor 77.

In addition, in vehicle display device 50, monitor 77 is not limited to being moved vertically, and may be fixed in state in which it protrudes towards an outer side from arm rest 76 or door trim 29. Further, monitor 77 may be configured such that it is embedded in arm rest 76 or door trim 29 with only the display face exposed. In addition, monitor 77 may be either of a liquid crystal panel or an organic EL display.

Display part 102 is not limited to a configuration in which both of the projection direction of information and the magnification ratio of information can be changed, and may have a configuration in which only the projection direction of information can be changed, or in which only the magnification ratio of information can be changed. It should be noted that in a case in which only the magnification ratio of information can be changed, two screen plates 108 are disposed so as to be spaced apart in the vehicle front-rear direction, for example, and there is a case in which information is projected onto screen plate 108 at the near side and a case in which information is projected onto screen plate 108 at the far side.

Further, instrument panel 32 and upper back panel 33 of vehicle display devices 100, 120 may be taken as examples of housing parts, and vertical movement parts 109, 113 as examples of motion parts. That is a display part, a housing part, and a motion part need not be provided at door trim 29.

In front seat 36, an axis part having the vehicle width direction as an axial direction, and an angle sensor that detects an angle of rotation of the axis part, may be provided at a connection part between seat cushion 36A and seat back 36B, and the inclination of seat back 36B may be detected based on the output from the angle sensor.

In vehicle display devices 50, 100, 120, 130, 140, 150, settings may be established such that the display of information is terminated when autonomous driving is deactivated.

In the foregoing, vehicle display devices according to exemplary embodiments and variant examples of the present disclosure have been explained; however, these exemplary embodiments and variant examples may be used in appropriate combinations, and a variety of embodiments may be implemented within a scope that does not depart from the gist of the present disclosure.

The present disclosure aims to obtain a vehicle display device that can suppress the occurrence of situations in which it becomes difficult for an occupant to view information at the display part during autonomous driving.

A first aspect of the present disclosure is a vehicle display device, that includes: a display part having a plurality of display faces that display information and that are provided at at least one location among a front face, a rear face, an upper face or a side face inside a vehicle cabin; a detection part that detects an orientation and a posture of an occupant; and a control part that selects a display face in accordance with the orientation and the posture of the occupant detected by the detection part, and controls display by the display part such that information is displayed at the selected display face.

In a vehicle display device of a first aspect, a detection part detects the orientation and posture of an occupant. Further, a control part selects a display face in accordance with the orientation and the posture of the occupant detected by the detection part, and controls display by the display part such that information is displayed at the selected display face. As a result, since the occupant can view information at a display corresponding to their own orientation and posture, it is possible to suppress the occurrence of situations in which it becomes difficult for an occupant to view information at the display part during autonomous driving. It should be noted that the orientation of the occupant means the direction in which the occupant is facing. Further, the posture of the occupant means the position of the occupant's body.

A second aspect of the present disclosure is the vehicle display device of the first aspect, wherein: the display part is capable of expanding and contracting information displayed at the display face; and the control part effects control such that information displayed at the display face is expanded or contracted in accordance with a distance between the selected display face and a head region of the occupant.

In a vehicle display device of a second aspect, the control part effects control such that information displayed at the display face is expanded or contracted in accordance with the distance between the selected display face and the head of the occupant. As a result, since the occupant can view information in the most easily visible location and at the most easily visible size, it is possible to further suppress the occurrence of situations in which it becomes difficult for an occupant to view information at the display part.

A third aspect of the present disclosure is the vehicle display device of the first or the second aspect, wherein the display part includes a projector that is capable of changing at least one of a projection direction, or a magnification ratio of information displayed at the display face, in accordance with the selected display face.

In a vehicle display device of a third aspect, enabling a projector to display information in plural projection directions obviates any need to provide plural display parts. Further, enabling the projector to change the magnification ratio of information displayed at a display face obviates any need to move the display part in the projection direction relative to the display face. For these reasons, the display part can be achieved with a simple configuration.

A fourth aspect of the present disclosure is the vehicle display device of any of the first to the third aspect, further includes, inside the vehicle cabin: a housing part formed to be capable of accommodating the display part; and a motion part that moves the display part toward an outer side or an inner side of the housing part, wherein the control part moves the display face toward an outer side of the housing part in a case in which the display face of the display part accommodated in the housing part have been selected.

In a vehicle display device of a fourth aspect, in a case in which information is displayed at a display face, the control part moves the display face toward an outer side of a housing part. Here, since the display face is accommodated inside the housing part in a case in which information is not displayed at the display face, it is possible to suppress the occurrence of situations in which the display face becomes an obstacle to the occupant in a case in which the occupant is not viewing information.

A fifth aspect of the present disclosure is the vehicle display device of the fourth aspect, wherein the display part, the housing part and the motion part are provided at a door trim In a vehicle display device of a fifth aspect, since a display part, a housing part and a motion part are provided at the door trim, which is an existing furnishing, there is no need to newly provide furnishings for installing the display part inside the vehicle cabin.

Effects of the Invention

The present disclosure can suppress the occurrence of situations in which it becomes difficult for an occupant to view information at a display part during autonomous driving.

What is claimed is:

1. A vehicle display device, comprising:
   a display part having a plurality of display faces that display information and that are provided at at least one location among a front face, a rear face, an upper face or a side face inside a vehicle cabin;
   a detection part that detects an orientation and a posture of an occupant; and
   a control part that selects a display face in accordance with the orientation and the posture of the occupant detected by the detection part, and controls display by the display part such that information is displayed at the selected display face.

2. The vehicle display device of claim 1, wherein:
   the display part is capable of expanding and contracting information displayed at the display face; and
   the control part effects control such that information displayed at the display face is expanded or contracted in accordance with a distance between the selected display face and a head region of the occupant.

3. The vehicle display device of claim 1, wherein the display part includes a projector that is capable of changing at least one of a projection direction, or a magnification ratio of information displayed at the display face, in accordance with the selected display face.

4. The vehicle display device of claim 1, further comprising, inside the vehicle cabin:
   a housing part formed to be capable of accommodating the display part; and
   a motion part that moves the display part toward an outer side or an inner side of the housing part,
   wherein the control part moves the display face toward an outer side of the housing part in a case in which the display face of the display part accommodated in the housing part have been selected.

5. The vehicle display device of claim 4, wherein the display part, the housing part and the motion part are provided at a door trim.

6. The vehicle display device of claim 1, wherein the detection part comprises at least one of a direction sensor that detects the orientation of the occupant, an incline sensor that detects an angle of inclination of an upper body of the occupant relative to a vehicle front-rear direction, a sight line sensor that detects a sight line direction of the occupant, or a pressure sensor that detects the posture of the occupant.

7. The vehicle display device of claim 4, wherein the housing part includes at least one of an instrument panel, an upper back panel or an arm rest.

* * * * *